US011100461B1

(12) United States Patent
Fanelli

(10) Patent No.: US 11,100,461 B1
(45) Date of Patent: *Aug. 24, 2021

(54) METHODS AND SYSTEMS FOR INVENTORYING PERSONAL PROPERTY AND BUSINESS EQUIPMENT WITH BACKEND BUSINESS DEVELOPMENT SYSTEM

(71) Applicant: Protectovision, LLC, Windermere, FL (US)

(72) Inventor: Daniel Fanelli, Windermere, FL (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/543,577

(22) Filed: Aug. 18, 2019

Related U.S. Application Data

(62) Division of application No. 14/103,210, filed on Dec. 11, 2013, now Pat. No. 10,387,941, which is a division of application No. 13/277,861, filed on Oct. 20, 2011, now Pat. No. 8,615,450.

(51) Int. Cl.
*G06Q 30/06* (2012.01)
*G06Q 10/08* (2012.01)

(52) U.S. Cl.
CPC ....... *G06Q 10/087* (2013.01); *G06Q 30/0633* (2013.01)

(58) Field of Classification Search
None
See application file for complete search history.

(56) References Cited

U.S. PATENT DOCUMENTS

| 6,028,603 A | 2/2000 | Wang et al. |
|---|---|---|
| 6,732,162 B1 | 5/2004 | Wood et al. |
| 6,904,410 B1 | 6/2005 | Weiss et al. |
| 7,586,631 B2 | 9/2009 | Omori |
| 7,827,498 B2 | 11/2010 | Moore et al. |
| 7,899,823 B1 | 3/2011 | Trandal et al. |
| 7,899,887 B2 | 3/2011 | Conn et al. |
| 8,306,875 B2 | 11/2012 | Schneur |

(Continued)

OTHER PUBLICATIONS

To Protect Possessions, Americans Need to Know Their 'Stuff' New iPhone(R) Application from National Association of Insurance Commissioners Makes it Easy to Create a Home Inventory, Mar. 10, 2011, Pr Newswire, 5 pages.

(Continued)

*Primary Examiner* — Scott A Zare
(74) *Attorney, Agent, or Firm* — Brian S. Steinberger; Hilary F. Steinberger; Law Offices of Brian S. Steinberger, P.A.

(57) ABSTRACT

Methods and systems for documenting an inventory of items by accessing an inventory algorithm for creating an inventory list, adding two or more items to the inventory list, adding details about one or more of the items in the inventory list, identifying one or more real properties containing items in the inventory list, and linking one or more images with one or more of the items in the inventory list. The inventory can be created by providing a user with an access code to access the inventory list corresponding to the user, providing a reseller with access to the inventory algorithm for setting up a new user account and providing an authorized inventory professional with access to the inventory algorithm for creating the inventory list for the user.

16 Claims, 39 Drawing Sheets

(56) References Cited

U.S. PATENT DOCUMENTS

| | | |
|---|---|---|
| 8,615,450 B1 | 12/2013 | Fanelli |
| 9,015,074 B2 | 4/2015 | Chen et al. |
| 9,092,753 B1 | 7/2015 | Fanelli |
| 10,387,941 B1 | 8/2019 | Fanelli |
| 2001/0032151 A1 | 10/2001 | Paul et al. |
| 2002/0065825 A1 | 5/2002 | Kassan et al. |
| 2002/0107761 A1 | 8/2002 | Kark et al. |
| 2005/0278204 A1 | 12/2005 | Weinberg et al. |
| 2006/0031090 A1 | 2/2006 | Tarr et al. |
| 2006/0075442 A1 | 4/2006 | Meadow |
| 2007/0100713 A1 | 5/2007 | Del Favero et al. |
| 2007/0143123 A1 | 6/2007 | Goldberg et al. |
| 2007/0143155 A1 | 6/2007 | Whitsett et al. |
| 2007/0174130 A1 | 7/2007 | Seeley |
| 2008/0010171 A1 | 1/2008 | Ghanma |
| 2008/0033847 A1 | 2/2008 | McIntosh |
| 2008/0065514 A1 | 3/2008 | Eaton |
| 2008/0307512 A1 | 12/2008 | Tandon |
| 2009/0138560 A1 | 5/2009 | Stahl |
| 2009/0164421 A1 | 6/2009 | Pacella |
| 2009/0234678 A1 | 9/2009 | Arenas |
| 2010/0050107 A1 | 2/2010 | McIntyre et al. |
| 2010/0179837 A1 | 7/2010 | Artinger |
| 2010/0274728 A1 | 10/2010 | Kugelman |
| 2011/0015954 A1 | 1/2011 | Ward |
| 2011/0022500 A1 | 1/2011 | Scheinfeld et al. |
| 2011/0055751 A1 | 3/2011 | Morrison et al. |
| 2012/0020521 A1* | 1/2012 | Yamagami ............... G01S 5/16 382/103 |
| 2012/0047082 A1 | 2/2012 | Bodrozic |
| 2013/0246345 A1 | 9/2013 | Eisler et al. |

OTHER PUBLICATIONS

Protect What's Left After Spring Cleaning: Allstate Offers Tips for Creating a Home Inventory, Mar. 22, 2011, PR Newswire, 3 pages.

Fanelli, D., Office Action Summary for U.S. Appl. No. 13/890,803, filed May 9, 2013, received form the U.S. Patent Office, dated Jan. 28, 2014, 22 pages.

* cited by examiner

Fig. 1a

Home and Business Inventory

Logged in as: Dan Fanelli
Logout

| Inventory | Item Details | Properties | Estate Planning | Settings | My Account | Refer a Friend | Reports | Help | Admin | Reseller |

[ Save Changes ] ←—228

220

Use the tabs and fields below to edit specific details regarding Inventory item: Antique Chest of Drawers

| ✓ Item Details | ✓ Notes / Audio | ✓ Video | ✓ Documents | Warranty | Maintenance / Repairs |

You can use a video camera to record a short video about a specific inventory item. Videos recorded with the H.264 or H.263 video codec can be played online from this screen. Other acceptable video's can be uploaded into your account then later downloaded and played on your computer using a compatible player.

[ Add New Video File ] ←—224   225       227

Drag a column header here to group by that column

| Descriptive Name | File Size (bytes) |
|---|---|
| | |
| Play  Download  iphone test vertical | 3,019,802  Delete |
| Play  Download  Test Video 1 3GP file | 1,726,573  Delete |
| Play  Download  Test Video File - iPhone | 705,447  Delete |

Home and Business
Inventory

| Inventory | Item Details | Properties | Estate Planning | Settings | My Account | Refer a Friend | Reports | Help | Admin | Reseller |

Logged in as: Dan Fanelli
Logout

Add New Item ← 130

Click the 'Add New Item' button to add a new inventory item. Select an item below to view and/or edit the item details. Use the search bar to search and filter inventory items.

Drag a column header here to group by that column

| Columns | | | | | |

140 →

| Item Name | | | | | |
| Location | | | | | |

151       152
↓ Category  ↓ Location
Remember ☐ Property ☐ Category ☐ Location

| | Item Name | Property | Location | Category | Date Added | Purchase Price | Beneficiary | |
|---|---|---|---|---|---|---|---|---|
| | | | 143↙ | 141↙ | | 144↙ 160↙ | 170↙ | |
| | | | | Property | | Save & Add More Items | Save & Add Details | Cancel |
| | | | | Category | | | | |
| Select | Antique Chest of Drawers | Windermere House | Den | Antique | 11/17/2010 | $1,800.00 | Daniel R. Fanelli, Jr. | Delete |
| Select | Antique Desk (Ornate Wood) | Windermere House | Dining Room | Antique | 2/2/2011 | $2,000.00 | Clinton Stuart Fanelli | Delete |
| Select | Antique Four Poster Bed | Windermere House | Bedroom 3 | Antique | 12/29/2010 | $1,500.00 | Christina Anne Love | Delete |
| Select | Antique Roll-Top Desk & Chair | Windermere House | Bedroom 3 | Antique | 12/29/2010 | $2,000.00 | Christina Anne Love | Delete |
| Select | Antique Silver Tray | Windermere House | Dining Room | Antique | 2/2/2011 | $150.00 | Clinton Stuart Fanelli | Delete |

METHODS AND SYSTEMS FOR INVENTORYING PERSONAL PROPERTY AND BUSINESS EQUIPMENT WITH BACKEND BUSINESS DEVELOPMENT SYSTEM

CROSS REFERENCE TO RELATED APPLICATIONS

This application is a divisional application of U.S. patent application Ser. No. 14/103,210 filed Dec. 11, 2013, now U.S. Pat. No. 10,387,941 issued Aug. 19, 2019, which is a divisional application of U.S. patent application Ser. No. 13/277,861 filed Oct. 20, 2011, now U.S. Pat. No. 8,615,450, the entire disclosure of which is incorporated herein by specific reference thereto.

FIELD OF THE INVENTION

This invention relates to inventory tracking and, in particular, to methods, systems and devices for methods and systems for inventorying personal property and business equipment singularly or in combination with backend business development system for multiple subgroups to utilize the business method for sale, distribution and inventory completion and inventory data storage.

BACKGROUND AND PRIOR ART

U.S. Patent Application No. 2007/0143123 issued to Goldberg et al. discloses a system, method and service for recording household assets that includes a step of identifying a residential property, items contained within the residential property and the items can be categorized. Entries for each of the categorized items can be recorded within a household asset tracking database. Digital images of the residential property can be obtained, where the digital images are images taken of actual items of the residential property. The digital images can be linked to the entries for the items which are shown in the digital pictures. The linked images and entries can be stored in a data storage remotely located from the residential property. An authorized user can be provided with searchable access to the entries and linked images of data store.

U.S. Patent Application No. 2010/0179837 issued to Artinger teaches process steps implemented in a system via logon page, the webpage includes an "inventory link" to a spreadsheet which contains item description, inventory list and photo. In a webpage, the insured has scanned or made a digital copy of important documents, the insured selects "Virtual Vault" link to be directed to the upload/download web page. At the upload/download web page, the insured selects each scanned document for uploading to the database. A claim item box includes item description of the insured item and an "MER" (market evaluation report) button which links to "MER" webpage.

U.S. Patent Application No. 2009/0138560 issued to Stahl. discloses a server host for an automated inventory recording program and has its own domain. In the context of an inventory system, and enables an information object, such as a photograph, to be captured remotely and transmitted over a communications network to a proxy email address where it is automatically processed into an inventory record on the desired inventory list without the user needing to have any further interaction with the inventory system than the transmission of the object. Additionally, the step that utilizes email as the transportation method includes filtering to restrict data submission thereby preventing or greatly mitigating false record entries.

U.S. Patent Application No. 2008/0033847 issued to McIntosh teaches an asset inventory system that is intended to focus on real estate and to inventory personal property, i.e., yachts and aircraft owned by user of system. After photographic inventory is assembled, it is then reduced to a computer readable Compact Disc or CD, and may also be listed on an internet website for remote access or reduced to other forms that retain the information in a safe and accessible form.

U.S. Patent Application No. 2007/0174130 issued to Seeley teaches systems and methods for remote access to a computerized inventory, which includes images of items stored in a storage unit that is assigned to a customer, so that the customer may view the images of the stored items. The remote access may further allow the customer to select particular items, according to the images, and send instructions to a storage facility representative, concerning those selected items.

U.S. Patent Application No. 2007/0100713 issued to Del Favero et al. teaches methods and systems for isolating and capturing an image of an inventory item from an image that contains multiple items and/or extraneous space. The user interface allows the user to import an image into an application, identify one or more regions of the image as corresponding to separate inventory items, and create inventory records corresponding to those items or update existing inventory records to include the images of those items.

U.S. Pat. No. 7,899,823 issued to Trandal et al. abstract describes inventory management using digital imaging, wireless communications, and voice and data networks that simplify the data capture, organization, and secure storage of a personal property owner's list of belongings. In addition, embodiments are described facilitating the insurance claims process, reducing the cost to the insurance industry of claims management.

U.S. Pat. No. 6,732,162 issued to Wood et al. is directed to a broad-based solution for acquisition, processing and distribution of media objects including pictures (images), movies, videos, graphics, sound clips, etc via the Internet or the like.

U.S. Patent Application No. 2008/0010171 issued to Ghanma teaches a method for distributing inventory information in a communication system wherein a service provider's core database communicates with resellers to enable the resellers to select a portion of the inventory information and compile the selected inventory information in an automatically updateable pull frame which is communicated to be displayed on a web page operated by the reseller.

U.S. Patent Application No. 20100274728 issued to Kugelman abstract shows video verification of some/all aspects of remote business transaction, client sends plurality of items to recipient. Upon reception of these items, recipient creates inventory of the items, including video verification of the inventory.

U.S. Patent Application No. 2010/0050107 issued to McIntyre et al., shows instructing presentation of digital image record (which may include video), on a display; instructing presentation of tab on the display, the tab appearing near or emanating from the displayed digital image record, wherein the tab is an access point configured to allow user access category of information related to content contained within. A user accesses account with image collection that contains digital image records and acts as an access point that is configured to allow the user to access a category of information.

U.S. Patent Application No. 2011/0055751 and 2011/0022500 issued to issued to Morrison et al. and Scheinfeld et al., respectively, teach online catalogs that include video playlist for a product/service with identifiers which includes product service information such as name, description, and pictures.

Related published patent applications include U.S. Patent Application No. 2011/0015954 issued to Ward discloses a software program that allows uploading more than one photograph along with description; U.S. Patent Application No. 2008/0307512 issued to Tandon discloses a batch upload method; U.S. Patent Application No. 2007/0143155 issued to Whitsett et al. shows inventory system comprising travel products; U.S. Patent Application No. 2006/0075442 issued to Meadow describes video taken which can be delivered to internet website where other can view; U.S. Patent Application No. 2006/0031090 issued to Tarr et al. describes method for providing images to a customer includes receiving a request for an image from a customer; and U.S. Patent Application No. 2002/0107761 issued to Kark et al. teaches plurality of hierarchically related product/service catalogs are maintained so as to maintain commonality with regard to information contained in the catalogs and to permit customization at each layer.

Related patents include U.S. Pat. No. 7,899,887 issued to Conn et al. construction of the multimedia albums which comprise digital content, such as photos and video clips, provided by multiple digital content contributors, taken from each contributor's unique perspective; U.S. Pat. No. 7,827,498 issued to Moore et al. describes method and system for client and server applications working together over modes of digital data transmission to collect, store, select, present, distribute and manage information for digital images, including photographs, pictures, videos, movies and other forms of digital media; U.S. Pat. No. 6,904,410 issued to Weiss et al. shows management of collectibles; and U.S. Pat. No. 6,028,603 issued to Wang et al. shows uploading a photo album and shows adding and deleting feature.

Other prior art includes U.S. Patent Application No. 2009/0234678 issued to Arenas; U.S. Patent Application No. 2001/0032151 issued to Paul et al.; and U.S. Pat. No. 7,586,631 issued to Omori.

SUMMARY OF THE INVENTION

A primary objective of the present invention is to provide methods and systems to complete an inventory of the personal property for any individual, family, business, government or military entity, or other user.

A secondary objective of the present invention is to provide methods and systems inventory software that is stored and maintained on the provider's inventory secure computer system or a professional providers service, with inventor storage space leased by the user, and therefore the software never has to be downloaded or updated by the user.

A third objective of the present invention is to provide methods and systems for inventory software capable of securely storing plural digital inventory photos, videos and documents for each individual, family and or business client for stored files that are accessible from anywhere in the world where the internet is available.

A fourth objective of the present invention is to provide methods and systems for inventory software wherein digital pictures can be uploaded in groups of more than one picture at a time, called a "batch upload" that are stored on the "Batch Image Uploader" page or tab. One or more pictures can then be selected from the stack of pictures on the 'Batch Image Uploader" page. This page also displays the list of items, and the location for each item, that has been entered into the inventory. The selected uploaded pictures can then be sent directly to and stored with their respective item on the "Item Details" page.

A fifth objective of the present invention is to provide methods and systems for inventory software that allows the client to import and store one or more video file(s) of various video formats in the video tab area under each "Item Details" page. Some formats have the video player pre-installed on the provider's website and automatically play as they are downloaded from the provider's website. These video formats therefore "stream" or load and play automatically. Videos can be of items, overall rooms, or anything the user wants to store. Some video formats do not "stream," and instead play with the use of an installed video player on each specific computer. In this case, the video player is not on the provider's website, and instead the video file needs to be downloaded from the provider's website to be played on the computer the client is using.

A sixth objective of the present invention is to provide methods and systems for inventory software that allows inventory items to each have a beneficiary specified for estate planning, as well as an Estate Planning tab, for more detailed descriptions of the estate, property and intentions. An unlimited number of beneficiaries can be entered by the user, and each respective item can be linked to one or more beneficiaries.

A seventh objective of the present invention is to provide a backend business development system for multiple subgroups to utilize the program and business method for sale, distribution and inventory completion, and inventory data storage. This business process can be franchised, or used on a fee or commission basis.

A preferred embodiment of the invention provides an inventory system that includes a processing device, one or more inventory algorithms stored in memory connected to the processing device, one or more ports accessible by a user, an inventory software retail operator or an authorized inventory professional to enter an itemized inventory list, and an interface to connect one or more peripherals to the processing device to download one or more digital audio, digital images and digital video content and linking the download with one or more item in the inventory list. The inventory algorithm can include an inventory tab for entering items into an inventory list, a item detail tab for adding one or more of item details for each of the items in the inventory list, a property location tab to identify one or more property locations containing items in the inventory list of the item, and an estate planning tab to identify one or more beneficiaries and estate planning documents.

Another preferred embodiment provides a method for documenting an inventory of items that includes the steps of accessing an algorithm for creating an inventory list, adding two or more items to the inventory list, adding details about one or more of the items in the inventory list, identifying one or more real properties containing items in the inventory list, and linking one or more images with one or more of the items in the inventory list. Adding two or more items can include selecting one of adding another item to the inventory list, deleting one of the items, viewing details about one of the items and editing details about one of the items; the adding details step can include associating each item in the inventory list with one of the real properties; adding one or more of notes, audio, video, documents, warranty information and maintenance records with each item in the inventory list; associating a category with one or more of the items in the inventory list; and selecting one of adding one or more digital images for each one of the items in the inventory list, deleting one or more of the digital images and selecting one of the digital images as a default image of the item. The linking step can include uploading a batch of plural images and associating each one of the plural images in the batch with at least one of the items in the inventory list.

The adding details step can also include uploading a digital video to one or more of the items in the inventory list which can include automatically playing the video during the uploading step. The method can also include scanning a barcode or scan code associated one of the items, identifying the barcode or scan code, and automatically populating an item name corresponding to the recognized barcode or scan code to add items to the inventory list from a stored recognition database.

Another preferred system includes a processing unit with memory for storing an inventory list; an algorithm for creating an inventory list of items, the algorithm including instructions executable on the processing unit; an interface to allow a user to access the algorithm to create an user inventory list from a remote location; an inventory item field for a user to add an item to the user inventory list; one or more item detail fields for each of the items in the user inventory list; and a link to upload one or more images associated with one or more of the items in the user inventory list.

Further objects and advantages of this invention will be apparent from the following detailed description of preferred embodiments, which are illustrated schematically in the accompanying drawings.

BRIEF DESCRIPTION OF THE FIGURES

Figure 1A:
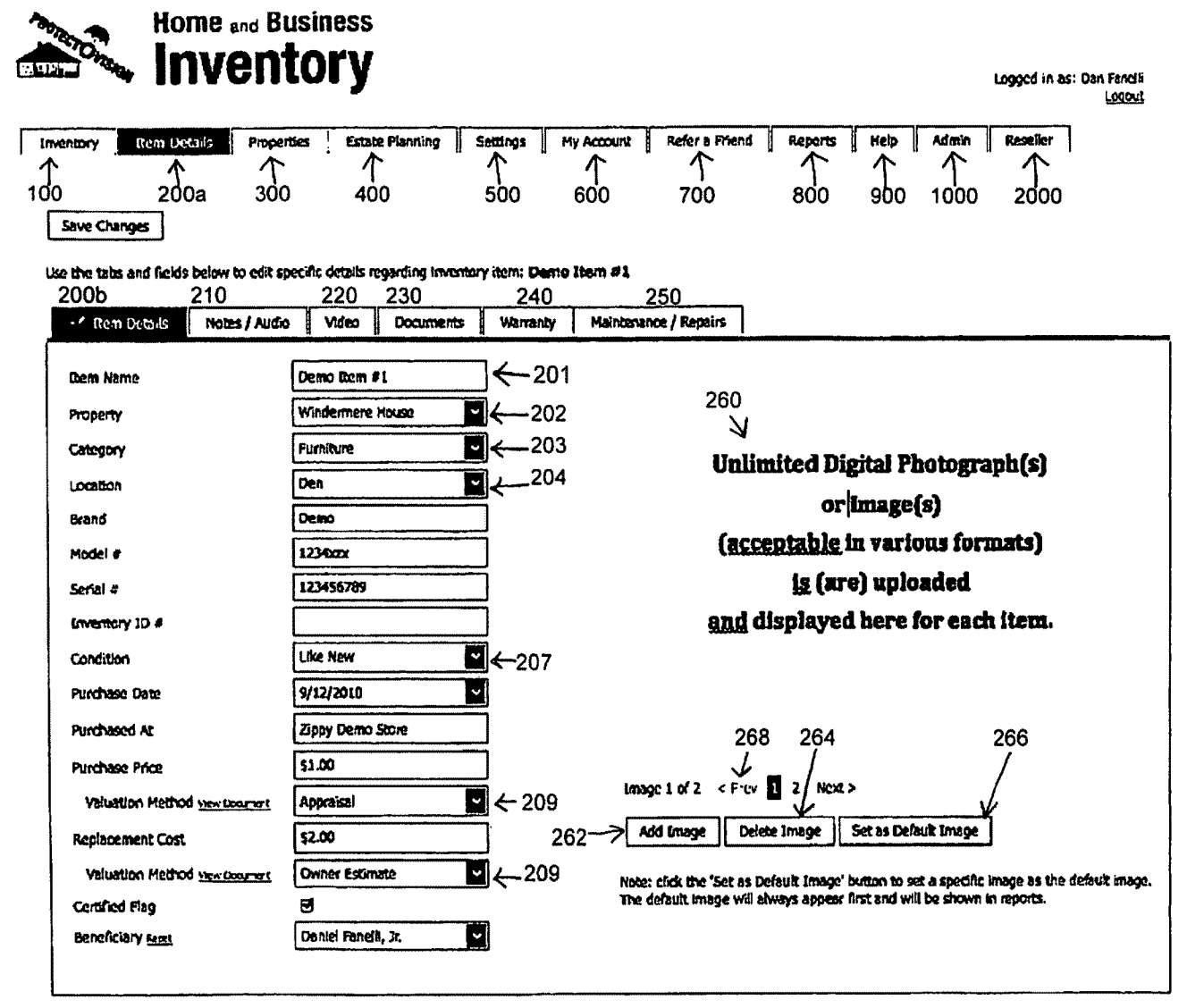

FIG. 1a shows an example of a display screen after a user has logged into an account and selects item detail tab.

FIG. 1c shows an example of a screen shot to associate video with an inventory item.

FIG. 1d shows an example of a screen shot to link documents with an inventory item.

FIG. 1f shows an example of a screen shot for listing real properties, the contents of which are generally inventoried.

FIG. 1i shows an example of an Inventory 100 tab screen shot that a new client sees before any items are entered.

FIG. 1j shows an example of a screen shot for the add multiple item memory tool.

FIG. 2a shows an example of a screen shot for under the Setting tab for entering different categories for the user to select from when entering inventory item details.

FIG. 5 shows an example of the screen for assigning "batch images" to one or more inventory items.

FIG. 6 shows an example of a screen shot for warranty information for each of the inventory items.

FIG. 10 shows an example of an administration screen for reseller default sales commission.

FIG. 14 shows an example of an administration screen for reseller commission, more specifically, paid commissions.

FIG. 19 shows an example of an administration screen for transactions including successful credit card transactions and failed automatic renewals.

FIG. 20a shows an example of a screen shot of the reseller tab, more specifically, users listed as resellers.

DESCRIPTION OF THE PREFERRED EMBODIMENTS

Figure 1B:
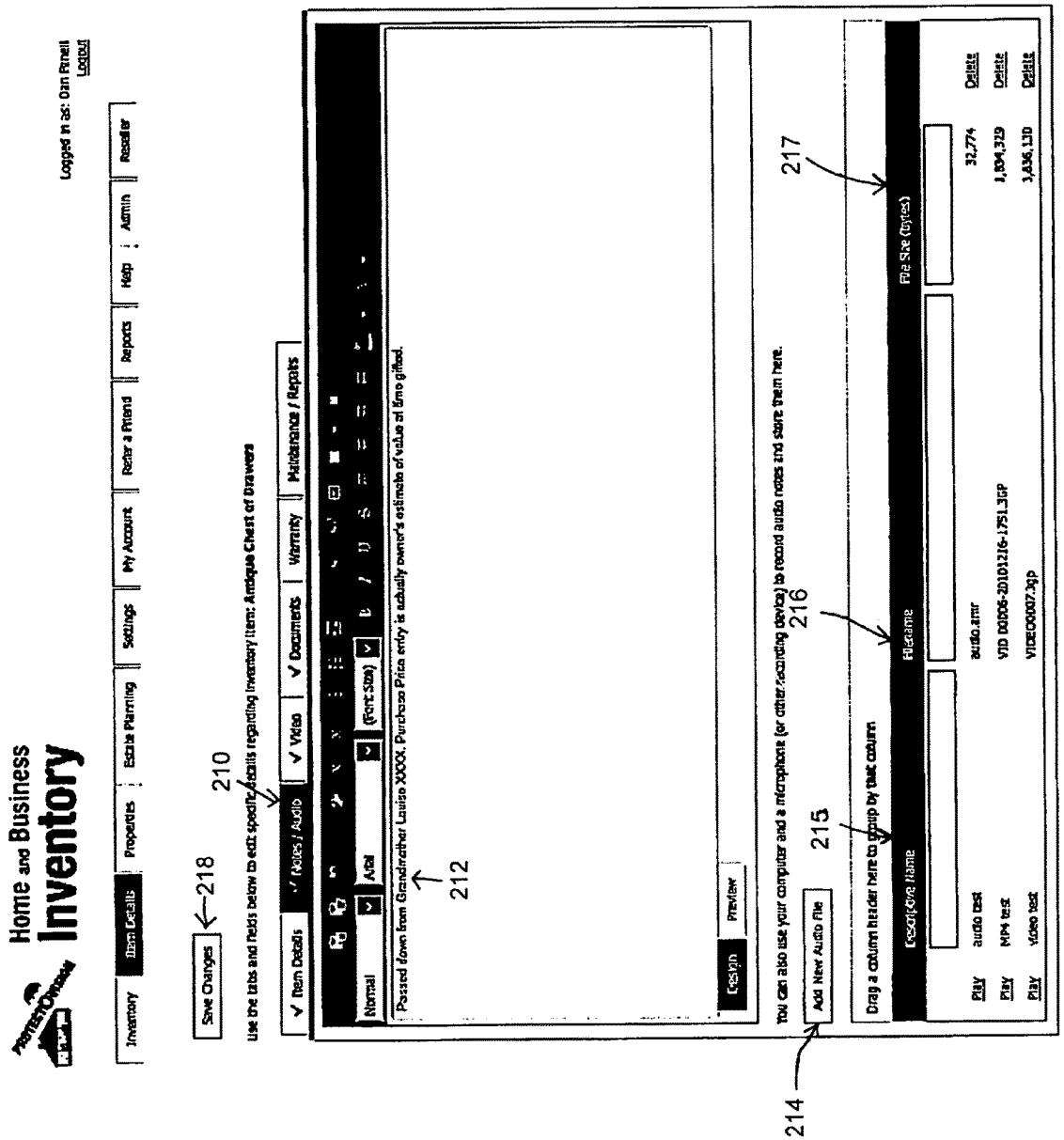
FIG. 1b shows an example of a screen shot for notes and audio for an inventory item.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:

| | | | |
|---|---|---|---|
| 100 | inventory tabs | 202 | property field |
| 130 | add new item | 203 | category field |
| 140 | new item field | 204 | location field |
| 141 | property field | 207 | condition field |
| 143 | location field | 209 | valuation method icon |
| 144 | category field | 210 | notes/audio tab |
| 150 | remember property box | 212 | note |
| 151 | remember category box | 214 | add new audio file icon |
| 152 | remember location box | 215 | note/audio namefield |
| 160 | save & add more items | 216 | note/audio file name field |
| 170 | save and add details | 217 | note/audio file size |
| 200a | item details main tab | 218 | save changes |
| 200b | item details tab | 220 | video tab |
| 201 | item name filed | 224 | add new video icon |
| 225 | video file name field | 560 | $3^{rd}$ party login setting tab |
| 227 | video file size field | 570 | $3^{rd}$ party login history tab |
| 228 | save video changes | 572 | $3^{rd}$ party login history tab |
| 230 | documents tab | 574 | authorized inventory-login hist |
| 234 | add new document icon | 580 | permission settings tab |
| 235 | document name field | 590 | batch image uploader setting tab |
| 236 | document type field | 600 | My Account tab |
| 237 | document file name field | 800 | Reports tab |
| 238 | document file size field | 900 | help tab |
| 240 | warranty tab | 1000 | administration tab |
| 250 | maintenance/repair tab | 1100 | admin pricing tab |
| 260 | image options | 1200 | admin emails tab |
| 262 | add image icon | 1300 | admin refer a friend |
| 264 | delete image icon | 1500 | admin transactions tab |
| 266 | set default image icon | 1600 | admin reseller commission tab |
| 268 | image selection | 1610 | default commission |
| 300 | Properties tab | 1620 | renewal commission |
| 400 | Estate planning tab | 1630 | unpaid commission |
| 500 | Settings tab | 1640 | commission pymt summary |
| 520 | category settings tab | 1650 | paid commissions |
| 530 | location settings tab | 2000 | reseller tab |
| 540 | document type settings | 2100 | reseller users tab |
| 550 | beneficiaries settings tab | 2200 | reseller inventory jobs |
| 2300 | reseller commissions | | |

The present invention provides methods and systems to complete an inventory of the personal property for any individual, family or business. As shown in FIG. 1a, after the user has logged into his account, the user is presented with a row of account tabs allowing the user to select one of the account tabs such as Inventory 100, Item Details 200a, Properties tab 300, Estate Planning tab 400, Settings tab 500, My Account tab 600, Refer a Friend tab 700, Reports tab 800, Help tab 900, Admin. tab 1000, and Reseller tab 2000. In the Example shown, the user selects the "item details" main tab 200a at the top of the screen to create an inventory list and is presented with a column of item details 200b corresponding to details about a specific item in the inventory.

Figure 1D:
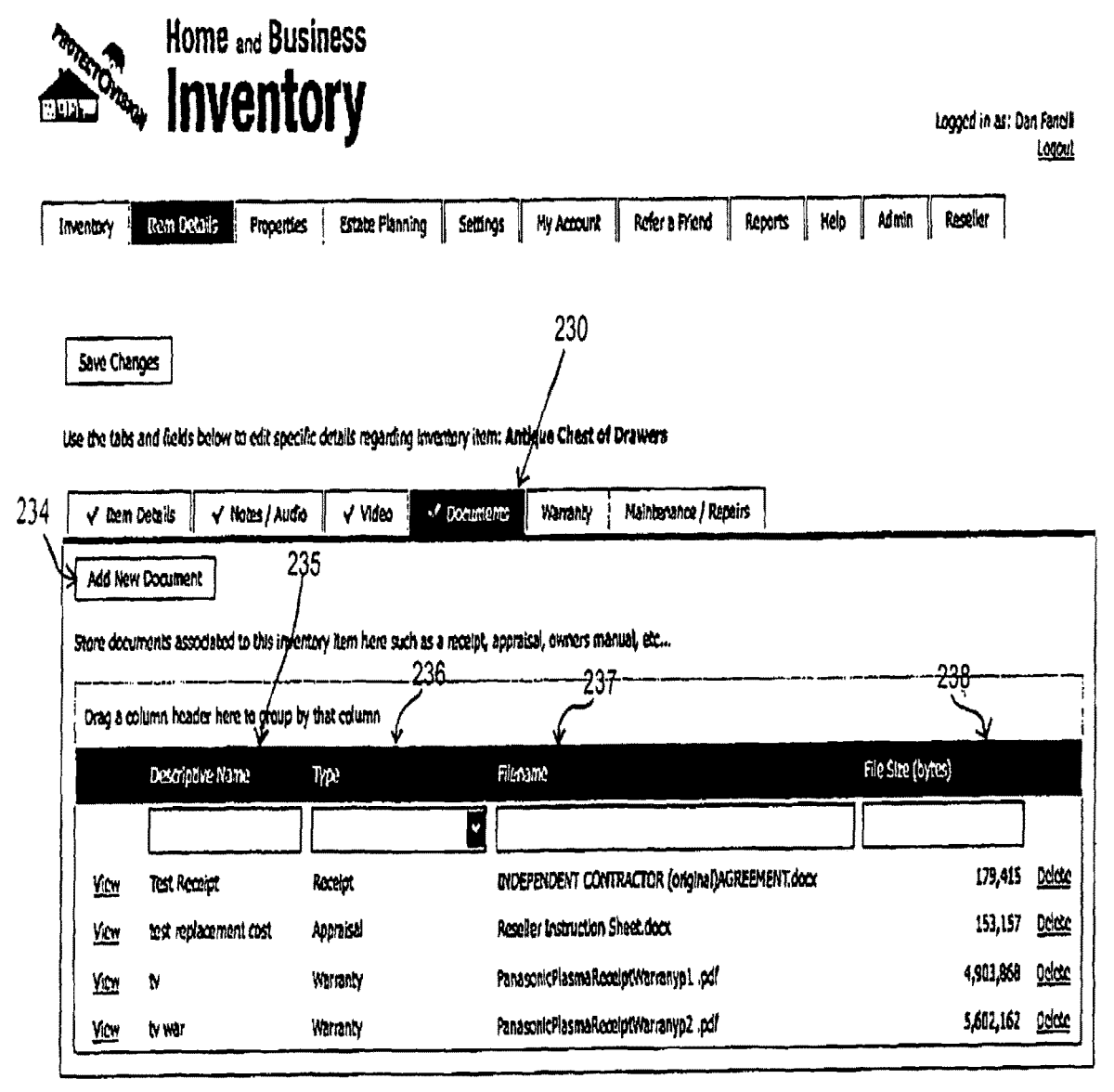

FIG. 1i shows an example of an Inventory 100 tab screen shot that a new client sees before any items are entered. When the user clicks on the Add New Item button, an Add Multiple Item Memory Tool is displayed that speeds up the inventory process. FIG. 1j shows an example of the add multiple item memory tool showing the items already entered, and the fields for the user to add additional items to the inventory. As shown, the Add Multiple Item Memory Tool screen is one way items are entered into the inventory. The Add Multiple Item Memory Tool has a memory check boxes to allow the user to selectively remember the previous entry location 151, category 152, or property 153, respectively, so that the user does not have to fill it in again when working in the same location, property, or same category item. The user can select one or all of the check boxes to remember specific information for the next item entered. As shown, there is also a Save & Add More Items 160 button icon for adding multiple items, and a Save & Add Details 170 button for entering the details for the item. The Add New Item 130 button 130, Item Name 140, Property 141, Location 143, Category 144, Remember box for Property 150, Remember box for Category 151, Remember box for Location 152.

In the preferred embodiment shown, the item detail tab 200b can include a information that more distinctly describes the item such as property 202, category 203, location 204, brand, Model No., Beneficiary and the like. Other entry options under the item detail tab 200b include inventory ID or BAR CODE; item Condition, Purchase Date, Purchase Location, Purchase Price, Valuation Method, and Replacement Cost. For the purchase price valuation method and replacement cost valuation method, there is a drop-down menu with 3 options: owner estimate, receipt, and appraisal. Also, the user can include an image of a document such as a receipt or an appraisal corresponding to the item. As shown, if an image is linked with the valuation method, the user can view the image by clicking on the "view document" icon.

When using inventory item recognition software, items can be entered automatically from the uploaded images or video. If the user is new, the inventory list will be blank when the inventory tab 100 is clicked. When a returning user clicks on the Inventory tab 100, a list of inventory items is displayed as shown in FIG. 2. From the inventory screen, the user can add new items, delete an item or edit information about the items by selecting one of the items in the list.

Referring back to FIG. 1, from the item details tab 200b, the user enters a physical property where the inventory item is found using the properties tab 300. For example, the property list can include home, business, and government entity as properties and the user can inventory which items are located at the home and at the business separately. When the user is adding details about the item, the property field 202 can include a drop down list for property selection. To add another level of detail, a preinstalled list of locations 204 within the property is available for selection. The user can also enter additional locations 204 within the property. For example, the item may be located in a specific room within the home or business. This additional field identifying a more specific location can be useful when, for example, one room is destroyed in a fire. Then the user has an inventory of the items typically found in that specific room of the home.

Figure 3:
FIG. 3 shows an example of a list of inventory items displayed under the Inventory tab.

After being entered, an item and information on the Item Detail page can be revised at Item Name 201, property 202, location within the property 204 and then add details about the item such as serial number, model number, inventory ID, purchase date, warranty, price paid, replacement price, evaluation method (receipt). An item's conditions 207 can be entered by allowing the user to select from a drop down list including, for example, "new", "like new", "good", "fair", and "poor". The user can include images of the new item such as one or more photos from different views. FIG. 3 shows an example of an item detail screen that includes an image 265 of the inventory item. The user can provide digital photos or videos in the image section 260 of the display using the add image button 262. After the new item is entered, the user clicks on Save Changes button 150 to save the new item in the inventory. This step is repeated until the user has entered all of the items to be included in the inventory.

Each inventory item should be associated to a location within the property. In the example shown in FIG. 1*j*, the locations are primarily rooms within the property. The system maintains a default list of locations to choose from when adding/editing inventory items. The location field 204 has a drop down list to select locations from. When a new location needs to be added, the user can simply go to the "setting" tab 500, select the location column then lock on the add location icon. A blank box is displayed for the user to add the name of the new location, for example, a game room can be added to the list of locations. After the new location has been entered, the location is saved. Now the location list includes the new location. With the new location in the list, the user selects the inventory tab to add the new inventory item that is located in the game room.

Inventory items should also be associated to a category. The system category field 203 includes default categories such as toy, book, clothing, antique, electronic equipment and the like in a drop down list. The user can maintain the list of categories to choose from when adding/editing inventory items. When a new category needs to be added, the user can simply go to "setting" tab 500, select the category column then click on add category. A blank box is displayed for the user to add the name of the new category, for example, a computer equipment can be added and saved to the list of categories. Now that the system includes the new category for computer equipment, the user selects the inventory tab, a list of inventory items is displayed and the user selects an item, such as Macbook Pro, and changes the category for the Macbook Pro from the default electronic equipment to the new category, computer equipment, and then clicks on save changes button 280.

Figure 2A:
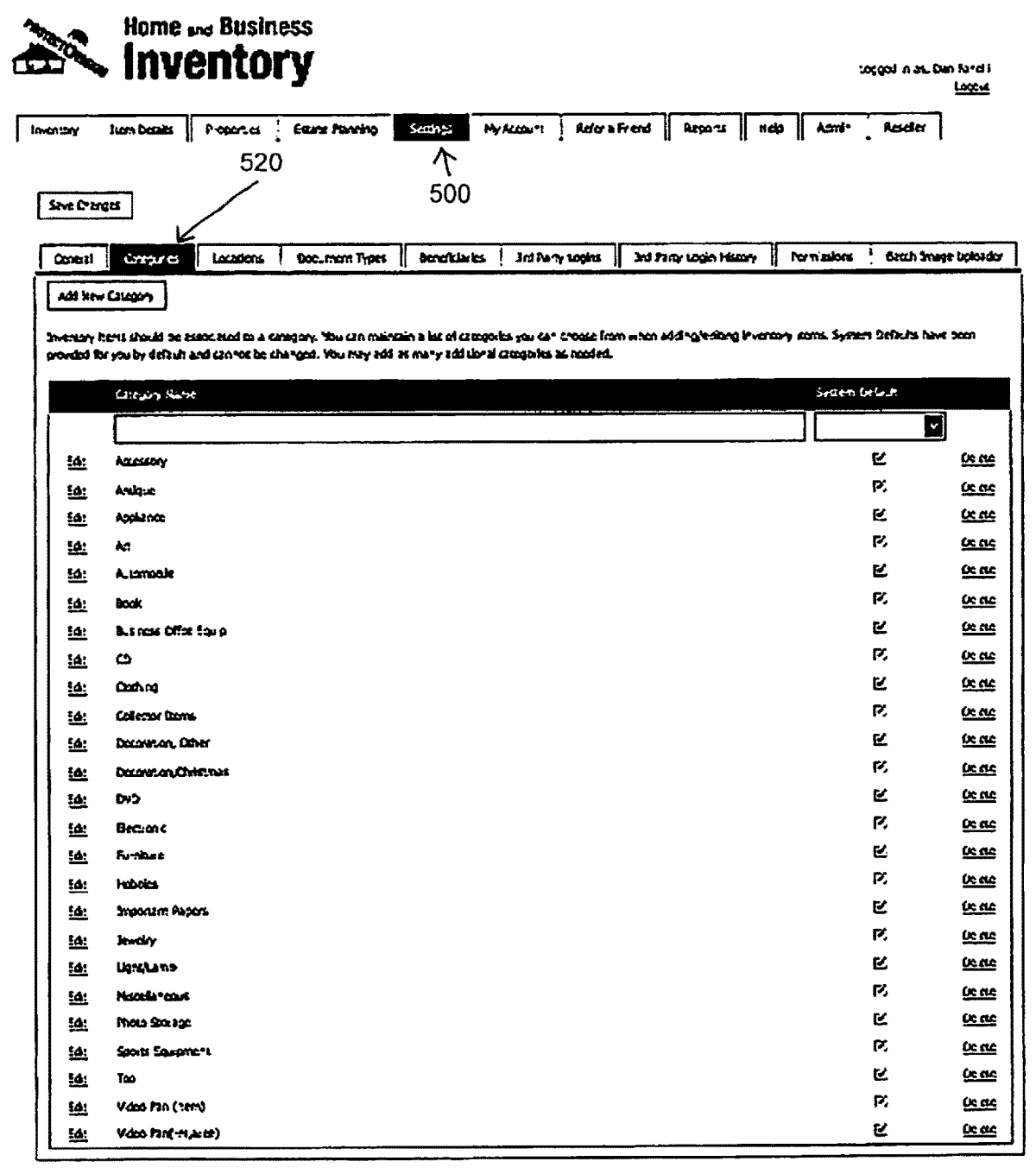

Under the setting tab, the user is allowed to enter categories, locations, document types, beneficiaries for the user to select from while entering inventory items. Referring to FIG. 1*a*, the inventory item details tab 200*b* allows the user to identify which property, category and location the inventory item is associated with. The fields include a drop down list for the user to select from that corresponds to the lists entered under the setting tab 500. FIG. 2*a* shows an example of a screen shot for entering different categories for the user to select from when entering inventory item details. In the example shown, the categories include accessory, antique, appliance, art, etc. Other setting lists entered by the user include categories 520 (FIG. 2*a*), locations 530 (FIG. 2*b*), document types 540 (FIG. 2*c*), beneficiaries 550 (FIG. 5*d*), third party logins 560 (FIG. 2*e*), and third party login history 570. Under third party log in history 570, there are two tabs, third party login history (FIG. 2*f*) that shows login activity and an authorized inventory professional login history (FIG. 2*g*) that shows authorized inventory professional login activity. Other tabs under settings 500 includes a permissions tab 580 (FIG. 2*h*) and a batch image uploader tab (FIG. 5*i*).

FIG. 2*a* shows an example of a screen shot under the Setting tab 500 for entering different categories 520. The list of categories is initially displayed for clients to use. These are the categories the user can then select from when entering inventory item details. The user can use the "Add New Category" button to add additional categories for their inventory. FIG. 2*b* shows an example of a screen shot under the Settings tab 500, more specifically, the Locations tab 530. By selecting the "Settings" tab, and selecting subtab "Locations", the user can use the "Add New Location" button to add additional locations.

Figure 2B:
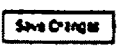
FIG. 2b shows an example of a screen shot under the Settings tab, more specifically, the Locations tab.
Figure 2C:
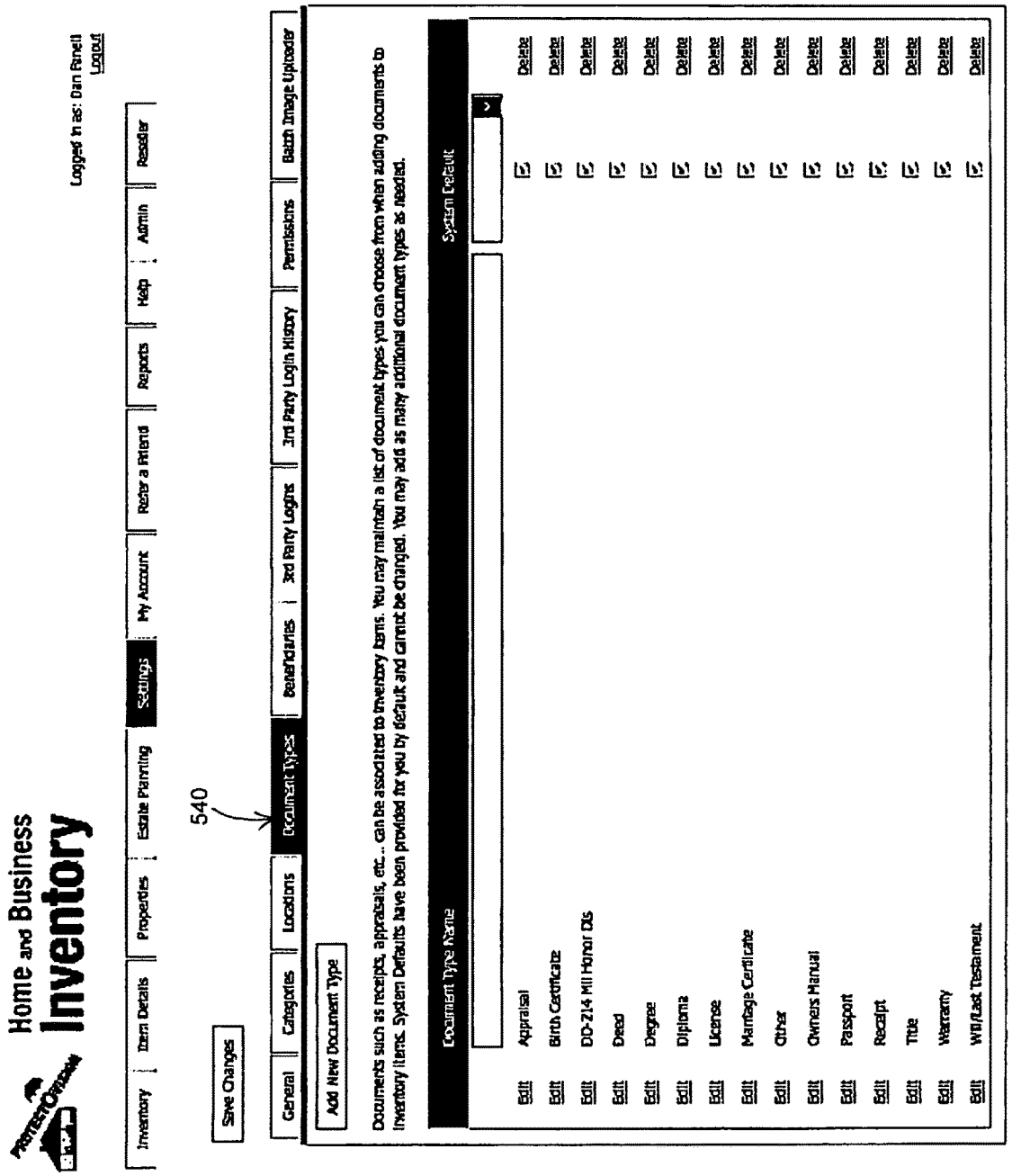
FIG. 2c shows an example of a screen shot under the Settings tab, more specifically, the Document Types tab.

FIG. 2*c* shows an example of a screen shot under the Settings tab 500, more specifically, the Document Types tab 540. As shown, the user can add documents such as receipts, appraisals and the like that can be associated to inventory items. The user can maintain a list of documents types for the user to select from when adding documents to inventory items. The system provides default document types that cannot be changed. However, the user can add new document types.

Figure 2D:
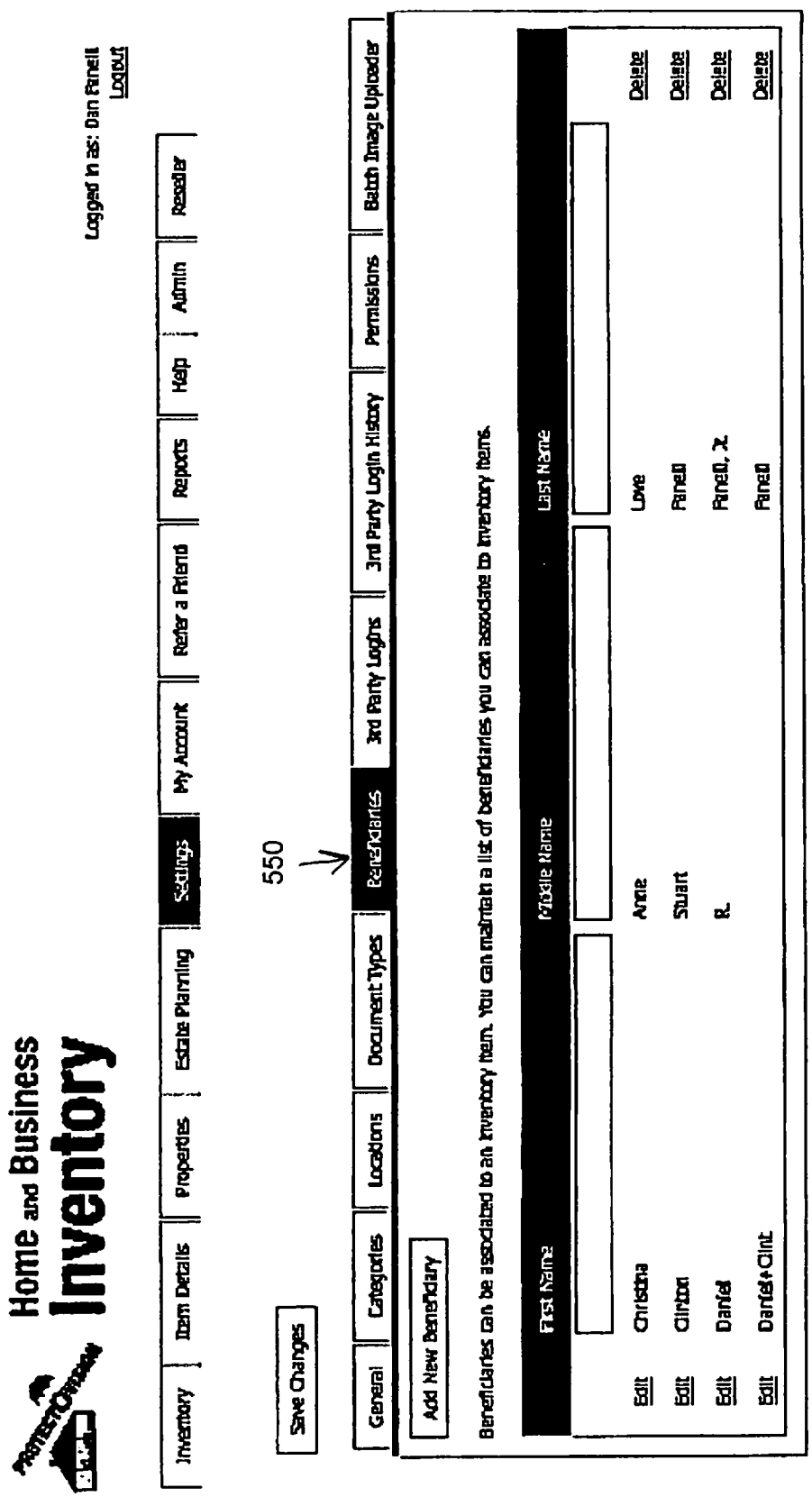
FIG. 2d shows an example of a screen shot under the Settings tab, more specifically, the Beneficiaries tab.

FIG. 2*d* shows an example of a screen shot under the Settings tab 500, more specifically, the Beneficiaries tab 550. As shown, beneficiaries can be associated to an inventory item. The user can maintain a list of beneficiaries that the user can associate to n inventory item. New beneficiates are added by clicking on add new beneficiary to display the form shown in FIG. 2*d* where the user enters the new beneficiary name.

Figure 2E:
FIG. 2e shows an example of a screen shot under the Settings tab, more specifically, the Third Party Logins tab.

FIG. 2*e* shows an example of a screen shot under the Settings tab 500, more specifically, the Third Party Logins tab 560. The "Add New $3^{rd}$ Party Login" button is used to add any new $3^{rd}$ Party individuals being granted this account access. As shown, a new $3^{rd}$ Party will be assigned a name and a password by the account owner, and the account owner can give $3^{rd}$ Party access to their account to anyone they choose. The $3^{rd}$ Party has limit access with "read only" capability. After a $3^{rd}$ party has been added, the user can click on send to send an email to the 3rd party with instructions for them to login. To inactivate a $3^{rd}$ party login, the user selects edit and then can uncheck the active box or can delete the $3^{rd}$ party from the list.

Figure 2F:
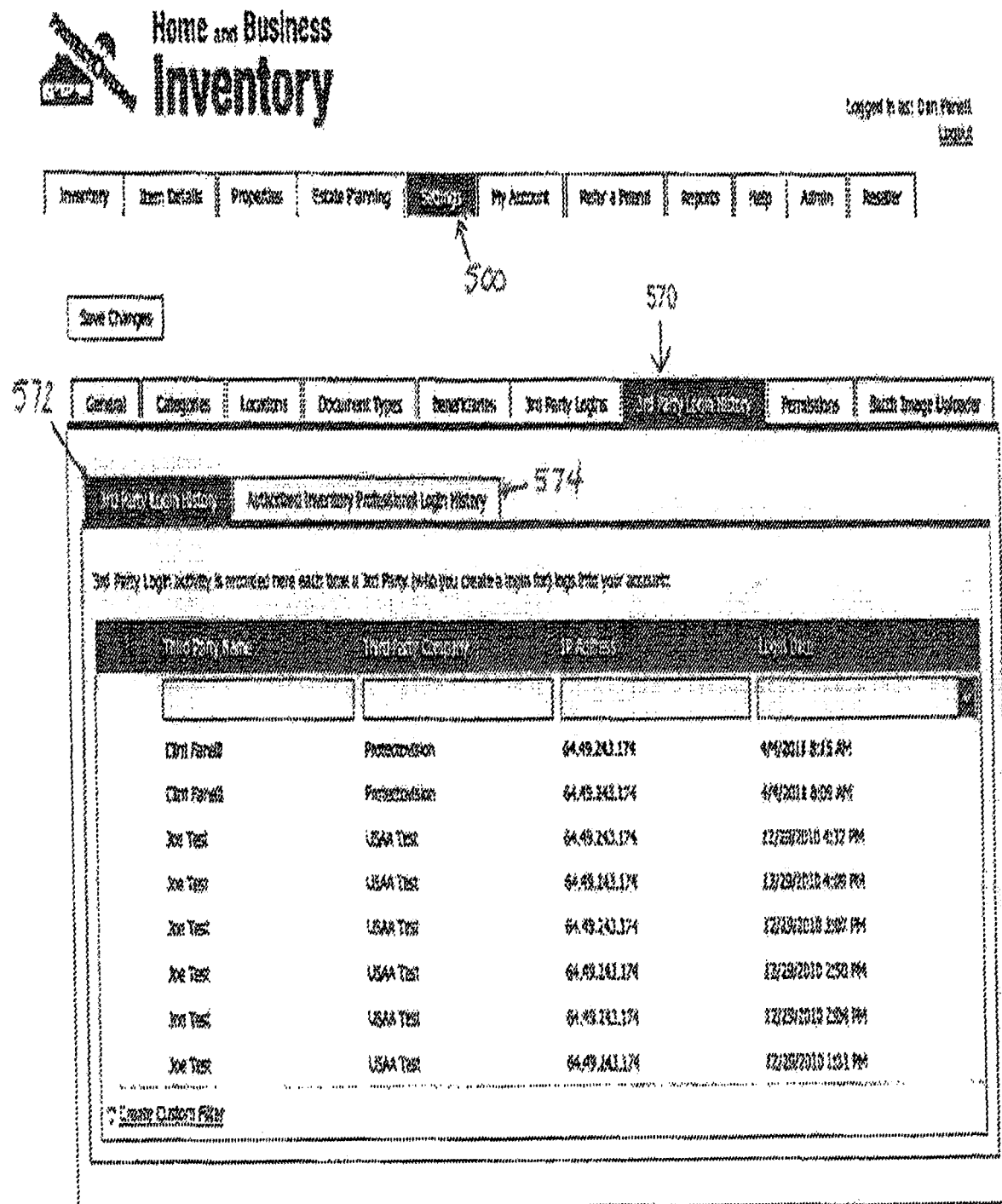
FIG. 2f shows an example of a screen shot under the Settings tab, then $3^{rd}$ Party Login History 570 tab, with sub-tab Third Party Login History tab.
Figure 2G:
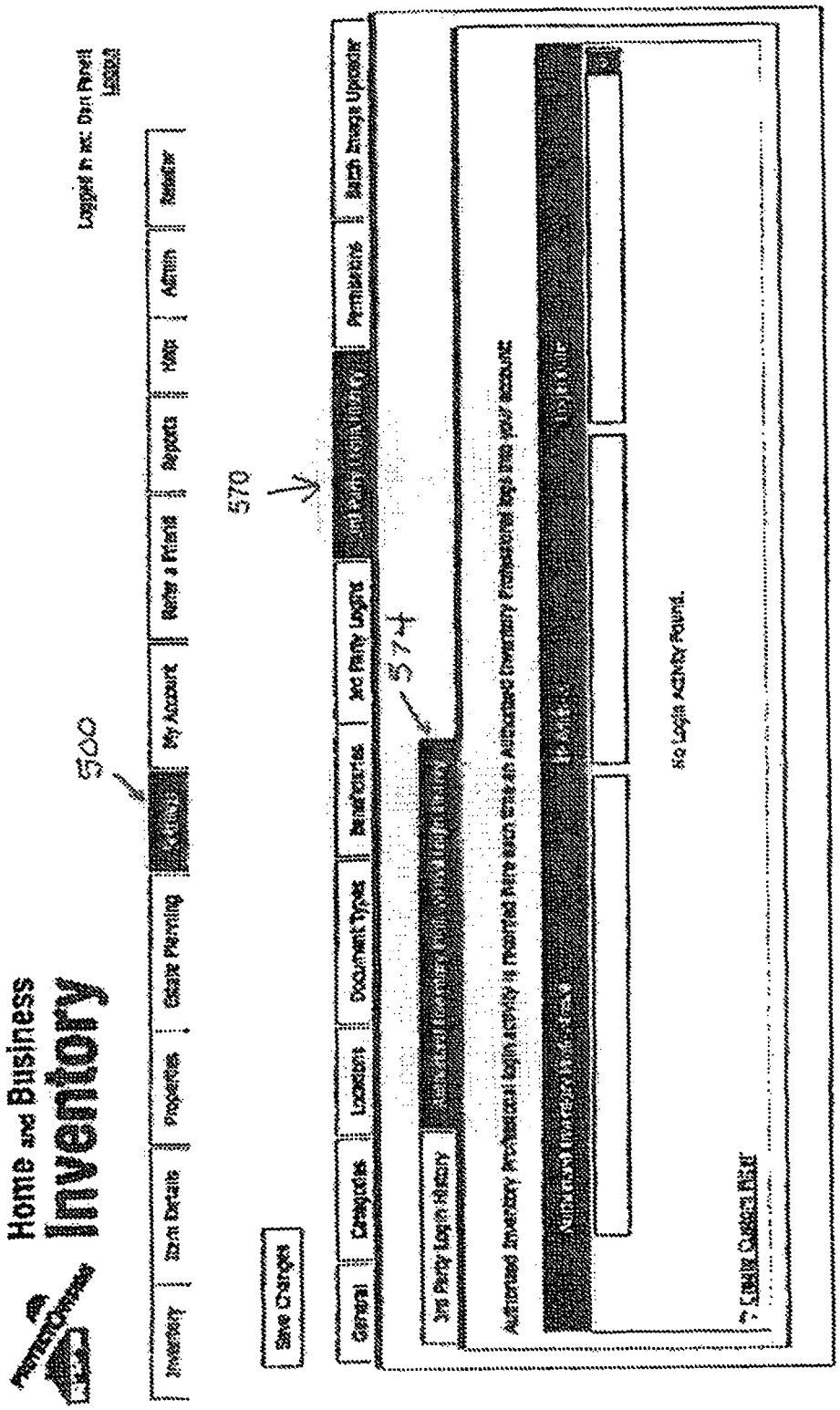
FIG. 2g that shows another example of a screen shot under the Settings tab for $3^{rd}$ Party Login History tab, with sub-tab Authorized Inventory Professional Login.

FIG. 2*f* shows an example of a screen shot under the Settings tab 500, then $3^{rd}$ Party Login History 570 tab, showing the sub-tab Third Party Login History tab 572. FIG. 2*g* shows another example of a screen shot under the Settings tab 500 for $3^{rd}$ Party Login History tab 570, with sub-tab Authorized Inventory Professional Login 574. For the security of the client's information, a History Log of Authorized Inventory Professional (AIP) access to the account, and is available for n review. In the example shown, there is no login history.

Figure 2H:
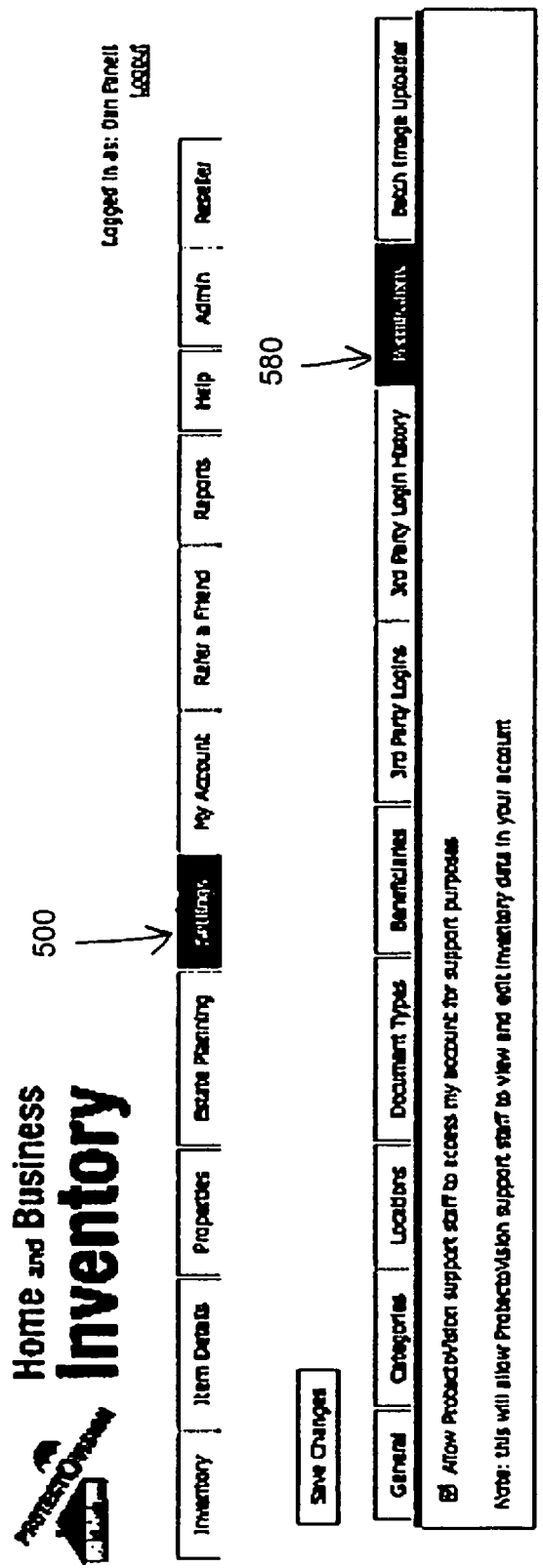
FIG. 2h shows an example of a screen shot under the Settings tab, more specifically, the Permissions tab.
Figure 2I:
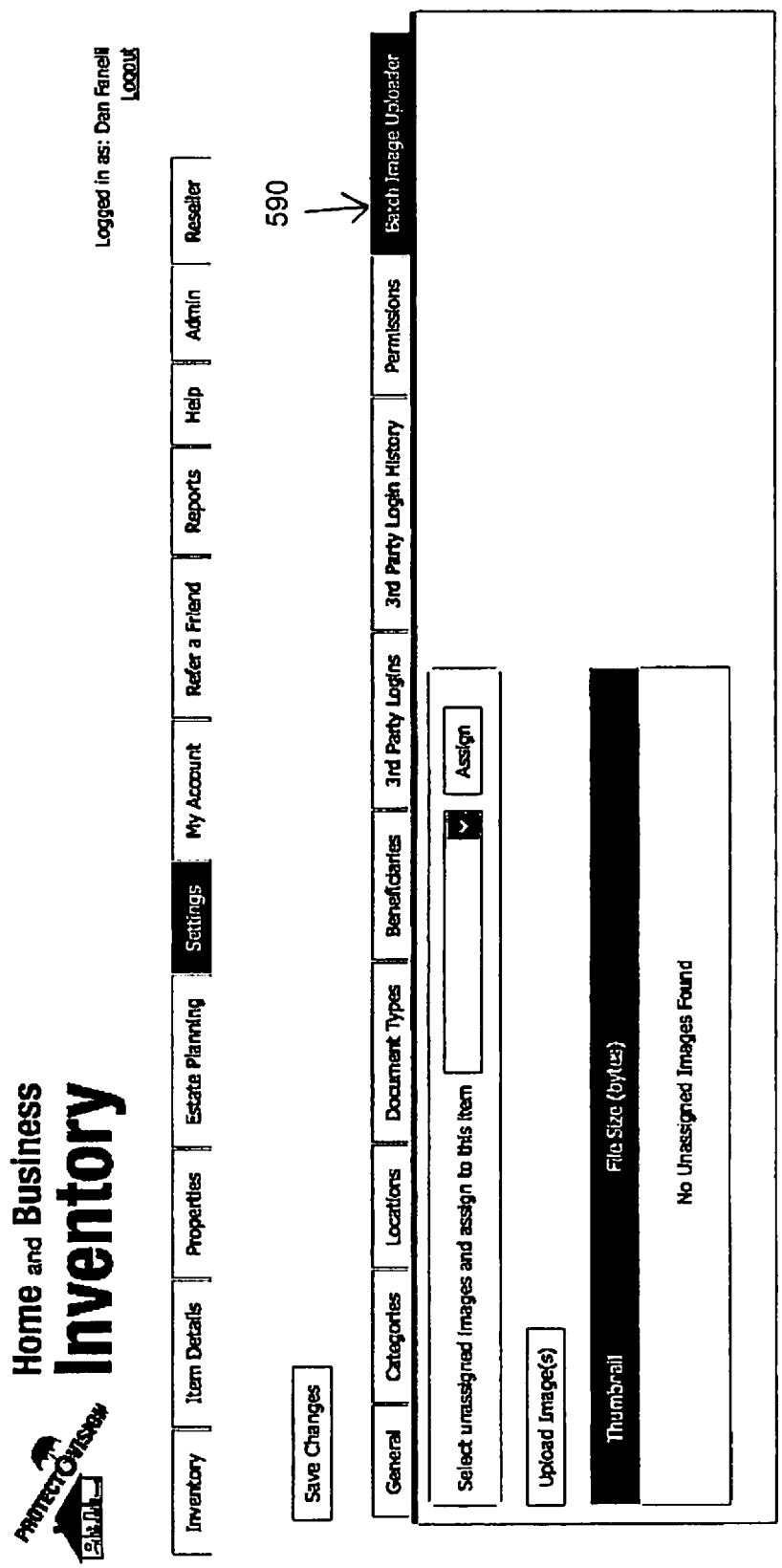
FIG. 2i shows an example of a screen shot under the Settings tab, more specifically, a Batch Image Uploader tab.

FIG. 2*h* shows an example of a screen shot under the Settings tab 500, more specifically, the Permissions tab 580. Putting a check in the Permissions box by the client account owner enables the support staff access to login to the client's account to view and edit inventory data. FIG. 2*i* shows an example of a screen shot under the Settings tab 500, more specifically, a Batch Image Uploader tab 590 for the user to assign images it inventory items.

Figure 4:
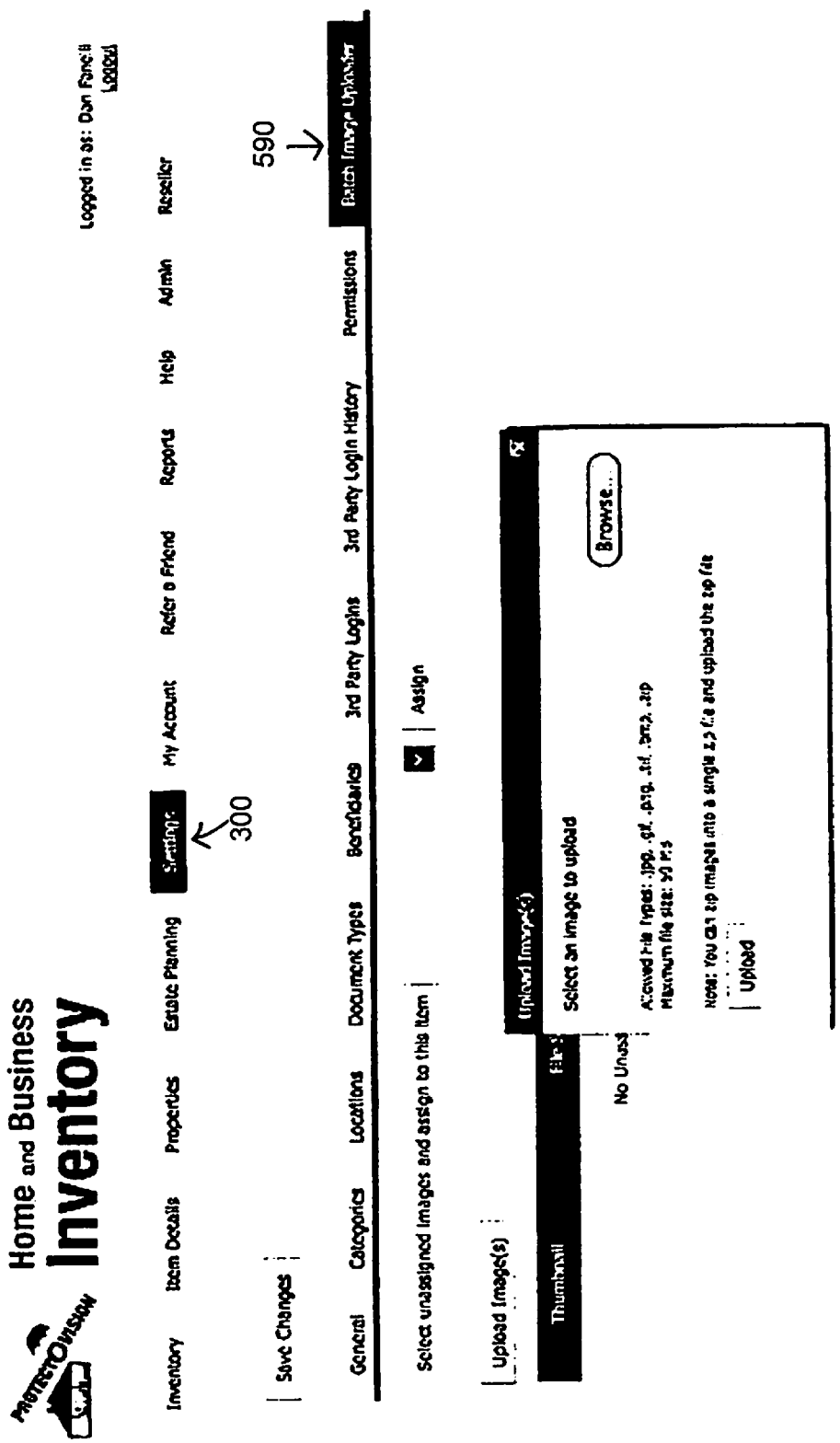
FIG. 4 shows an example of the screen displayed for uploading one or more images.
Figure 5:
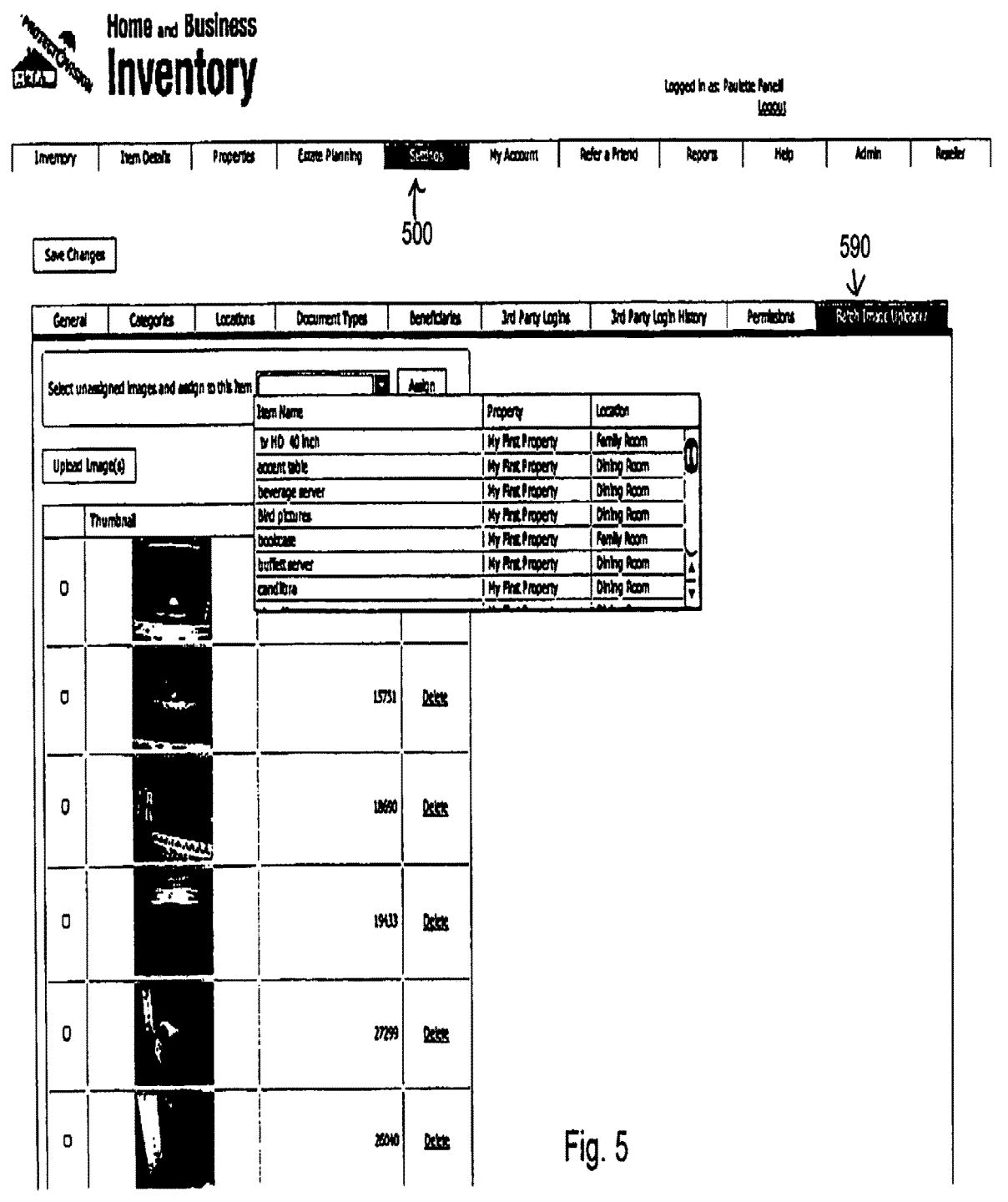

Another option under the setting tab 500 is batch images where the user can be prompted to upload images as shown in FIG. 4. As shown, the images can be any one of a variety of different formats. After the batch of images is uploaded, each images can be associated with one or more of the items in the inventory list. FIG. 5 shows an example of assigning the unassigned images with an item in the inventory list. This screen displays a column of thumbnail images and includes a field for selecting an item name to assign to an image.

Later, the user can view and or edit an inventory list or one or more specific items in the list. The user can select an inventory item from the inventory list so that the user can add one or more images to an inventory item, enter notes and or audio clips for an inventory item by typing notes manually with your keyboard or cutting and pasting directly from a manufacturers web site into the Notes/Audio tab 210. The user can also use the Documents tab 230 to upload and store a document such as a user manual for the inventory item.

The screen shots for the notes/audio tab 210, video tab 220 and document tab 230 are shown in FIGS. 1*b*, 1*c*, 1*d* and 1*e*, respectively. FIG. 1*b* shows an example of a screen shot for notes and audio for an inventory item. Under the notes/audio tab, the user is allowed to enter notes about the particular inventory item. In the Example shown, the note 212 indicate that the item was passed down by a relative and inventory about the relatives purchase of the item. The user also has the option of adding a new audio file 214. Across the bottom of the display is a list of notes and audio files already associated with the inventory item. The list includes a descriptive name 215, file name 216 and a file size 217. As with the item detail tab screen shot, the screen includes an icon for saving changes 218.

FIG. 1c shows an example of a screen shot to associate video with an inventory item. When the user selects the video tab 220 for an inventory tem the screen displayed includes instructions for linking one or more video files with the inventory item when the user clicks on add new video file icon 224. As shown, the user can use the tabs and fields to edit specific details regarding an inventory item. The user can also use a video camera to record video about a specific inventory item. Videos recorded with the H.264 or H.263 video codec can be played online from this screen. Other acceptable video's can be uploaded into the users account then later downloaded and played on the users computer using a compatible player. Similar to the notes/audio tab 210 screen, the screen displays a list of audio filed already linked showing the descriptive name 225 of the video file and the file size 227.

Figure 1E:
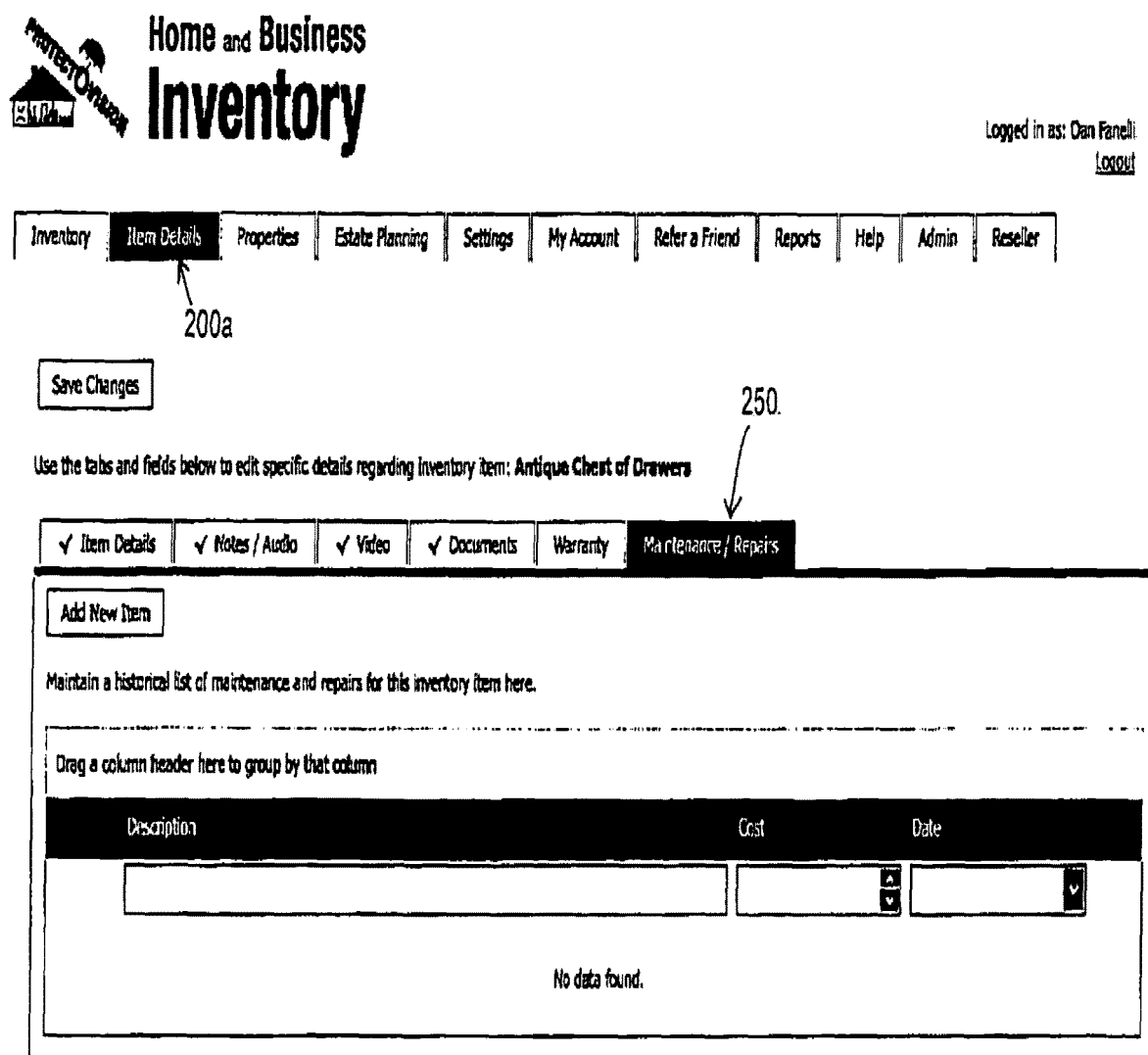
FIG. 1e shows an example of a screen shot for item details for maintenance and/or repair records for a specific inventory item.
Figure 1F:
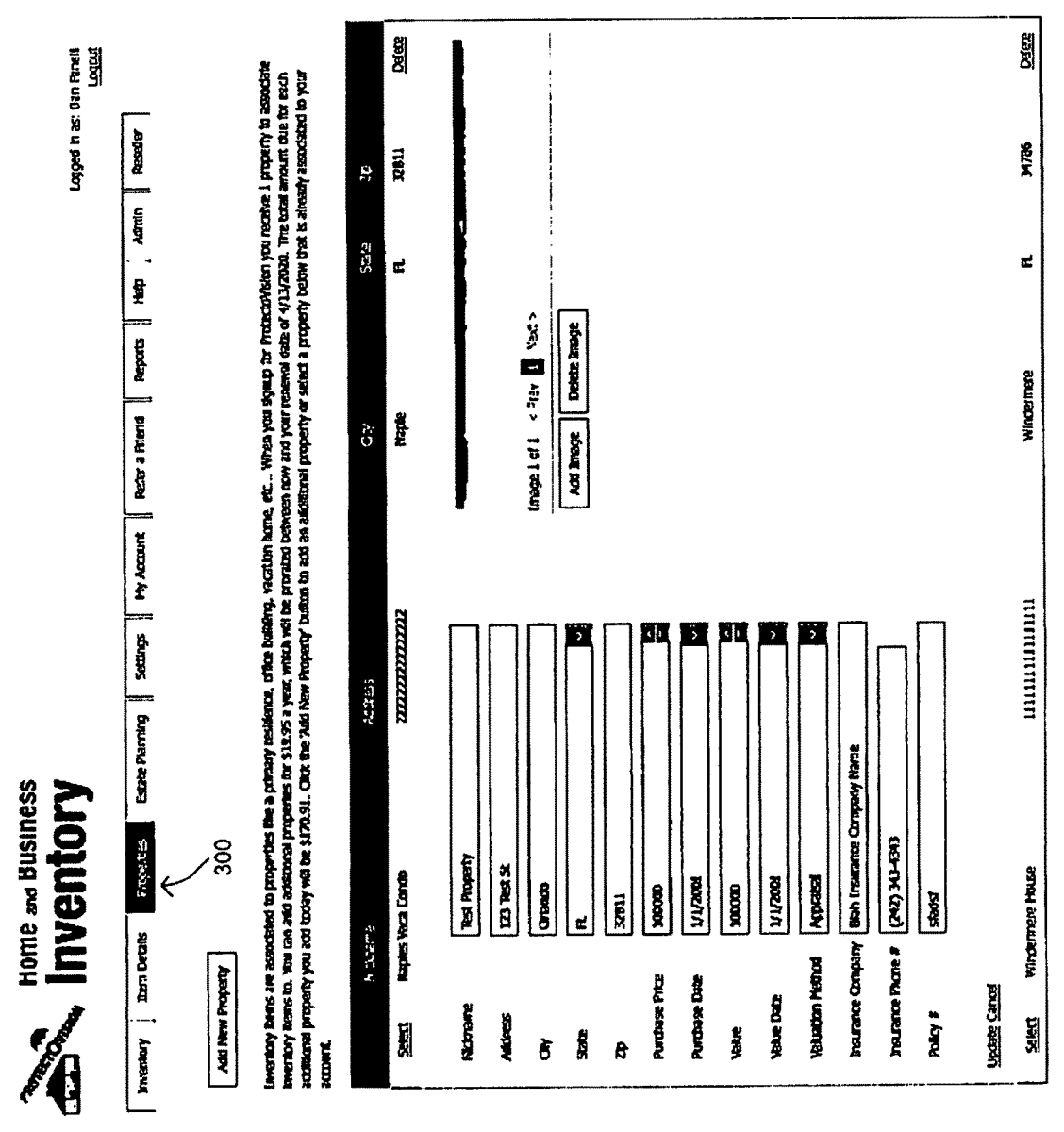

The document tab 230 under item details 200b allows the user to add new documents 234 and displays a list of documents when documents have already been added. FIG. 1d shows an example of a screen shot to link documents with an inventory item. The list of documents includes the document name 235, the type 236 of document, filename 237 and the size of the file 238. The documents tab also includes a view and a delete field to allow the user to view or delete a specific document. FIG. 1e shows an example of a screen shot for item details for maintenance and/or repair records for a specific inventory item. As shown, the maintenance/repair records 250 can include a written description including cost and date for the user to maintain an easy to access historical record. A new maintenance item can be added to the list by selecting the "Add New Item" button. The warranty tab 240 includes pertinent warranty information. To save the user time and make it easier for the user to know which tabs have content in them, any tab with stored content or information has a green checkmark on the tab.

Figure 1G:
FIG. 1g shows an example of a screen shot of a list of inventoried properties.
Figure 1H:
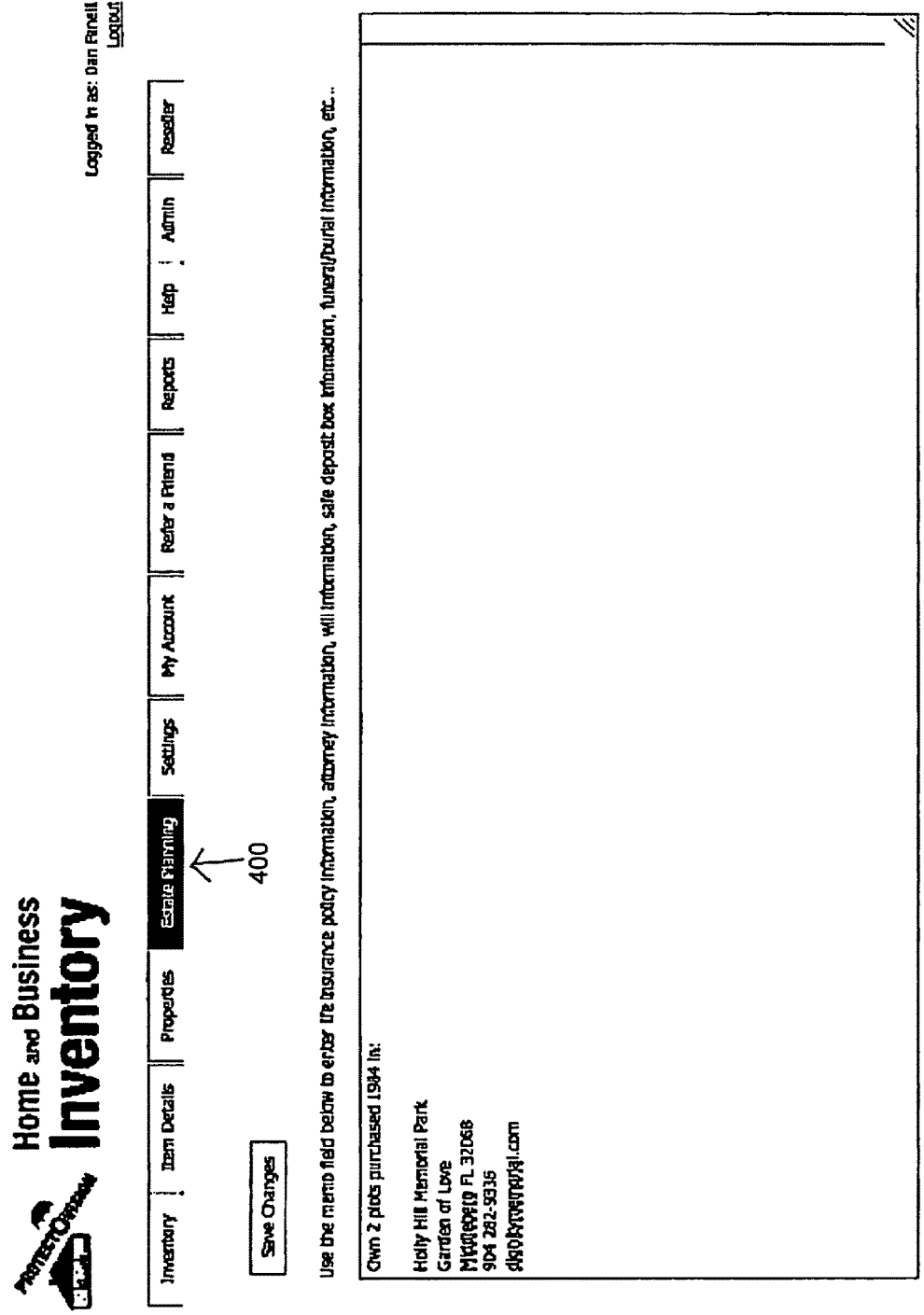
FIG. 1h shows an example of a screen shot for an Estate Planning tab.
Figure 1I:
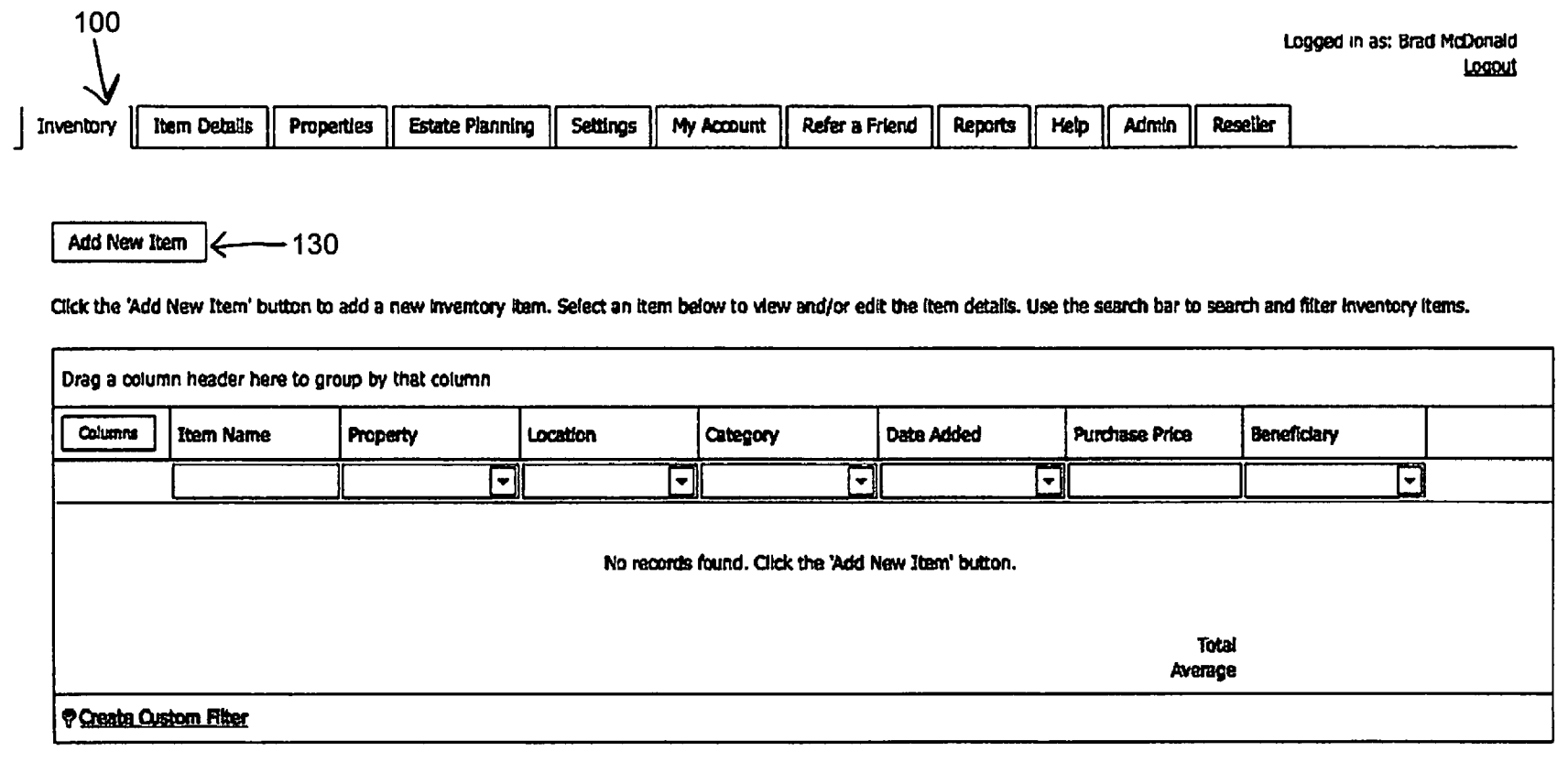

FIG. 1g shows an example of a screen shot of a list of properties that can be selected when entering items into the inventory list. By using the "Add New Property" button the user can add more properties for an additional fee, each one representing a different post office mailing address for a primary residence, office building, vacation home and the like. FIG. 1h shows an example of an Estate Planning tab 400 that includes a memo field to enter information such as insurance policy information, attorney information, will information, safe deposit box information, funeral/burial information and the like.

FIG. 1i shows an example of an Inventory 100 tab screen shot that a new client sees before any items are entered. The "Add New Item" button 130 is used to open the add new item window as shown in FIG. 1j for adding new items to the list. FIG. 1j shows an example of a screen shot for the add items including the item name 140, property 141 at which is item is found, the location 143 of the item within the property and the category 144 corresponding to the item being added.

Referring back to FIG. 1a in conjunction with FIG. 2, from the Inventory Tab 100, a list of inventory items and details about the inventory items is displayed as shown in FIG. 2. The user can select one of the items already listed in the inventory by clicking on an inventory item name 201 and clicking on the "select" icon adjacent to the name to display the item detail screen, then for example, select add image 262 icon to add new images associated with the inventory item. The user can, for example, then select notes/audio tab 210 to add additional information about the item such as, but not limited to, size, manufacturer specification, owner's manual, etc.

As previously described, when entering a new item, the program has a "New Item Memory Tool" with includes buttons that streamline the "item entry" and the "details" data entry process, saving time and allowing the user to enter lists of items without having to enter details about each of the items by using the "save and more items" button or to enter details about one or more inventory items without entering another item at that time by using the "save and add details" button. In this same area, the program has "remember" buttons that will remember one or more data entries for "Property", "Category" and "Location" to make completing the inventory faster, easier and more automated. This tool saves time and allows the user to enter multiple items from the same "property" and/or the same "location" and/or "category" without having to reenter the field for the repetitive "property" and/or "location" and/or "category", or go directly to the "Item Detail page" to enter detailed information specific to that inventory item.

The method and systems can use "computer vision" technology to automatically identify or recognize inventory items visually found in photographs and/or from video camera sources in order to automate and accelerate the inventory process and generate the inventory list, and details about each item on the inventory list.

"Computer vision" is the science and technology of making machines that see implementing algorithms that can automatically process images and videos to identify things. This inventory capability can have various levels of identification based on the stored recognition data base and the digital image information provided by the user while performing the inventory. The itemized inventory list automatically created using this capability can name basic inventory items such as chair, table or picture frame with minimal detail information for the item. Alternatively, the inventory methods and systems can be used for identifying very specific inventory items with extensive detailed information about each item such as Panasonic HDTV with the item's model number, Sony Surround Sound Receiver and model number, and identifying a Steinway Piano and model number, thus providing an automatic inventory list of the home or business.

In another embodiment, an identifiable bar codes scan code, QR code, or other scanable image that can be placed on the item and detailed information related to that code can be manually entered into the system. From that point the program can recognize that same scanable image for all subsequent data entry items associated with that item. Therefore, after scanning the bar code/scan code/or other identifying marking, the digital pictures taken for that item will go to their respective location within the inventory list, as well as any other detail or other information, thus automating and speeding up the inventory process.

Figure 8:
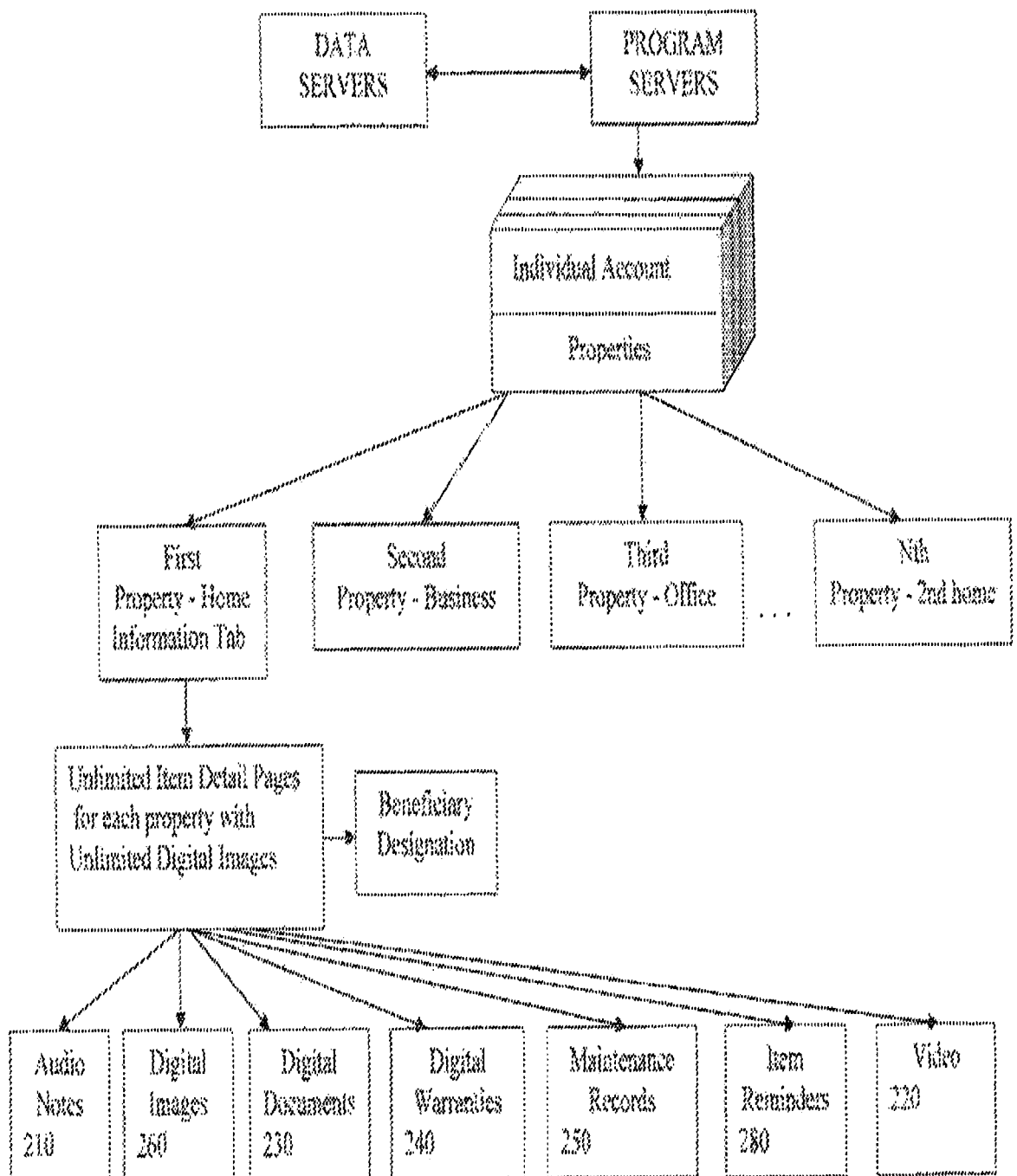
FIG. 8 is a block diagram showing an example of a inventory data base for one account with more than one property being inventoried separately.

As shown in FIG. 1 and FIG. 8, inventory item details 200b can include one or more tabs for entering digital notes and/or audio 210, video 220, documents 230, warranty 240 and maintenance/repairs data 250. FIG. 3 shows an example of the data entry page for adding or editing an inventory item with an image. For example, inventory item details can include one or more of upload photos in the image area that allows the user to access an unlimited number of images using the image selection filed 268. The image selection filed 268 allows the user to move forward or reverse when viewing one of multiple images for the item and shows the number of images associated with that specific inventory item. The example shown in FIG. 3 has three different images and allows the user to select any one of the three images or to view the next or previous image.

For each inventory item, the user can be as detailed as he/she likes with descriptive text, record voice info & description (for example, let Grandma talk about her antiques), store and access documents associated with each inventory item such as receipts, appraisals, owner's manual, certificate of authenticity, etc. Other related information can include the name of the store where the item was purchased, the manufacturer or 3rd party detailed warranty information. When the information is added to the inventory item detail, the inventory list can be used by the user to maintain detailed records of maintenance and repairs for each inventory item.

FIG. 4 shows an example of the screen displayed for uploading one or more images. As shown, plural images can be uploaded in a batch and the inventory system accepts images in a variety of different formats. Digital pictures can also be uploaded in individually or in groups of more than one picture, called a "batch upload" that are stored on the "Batch Image Uploader" page or tab using the "Batch Image Uploader" tool. FIG. 5 shows an example of the screen for assigning "batch images" to one or more inventory items. Referring to FIG. 5, one or more pictures can be selected from the stack of pictures on the "Batch Image Uploader" display page so that the picture can be removed from the "Batch Uploader" display page and delivered to its correct "Item Detail" page. After one or more photos are uploaded, the system allows the user to manage the photos for each inventory item by adding new images, deleting one or more images and setting one of the photos as a default photo.

Figure 7:
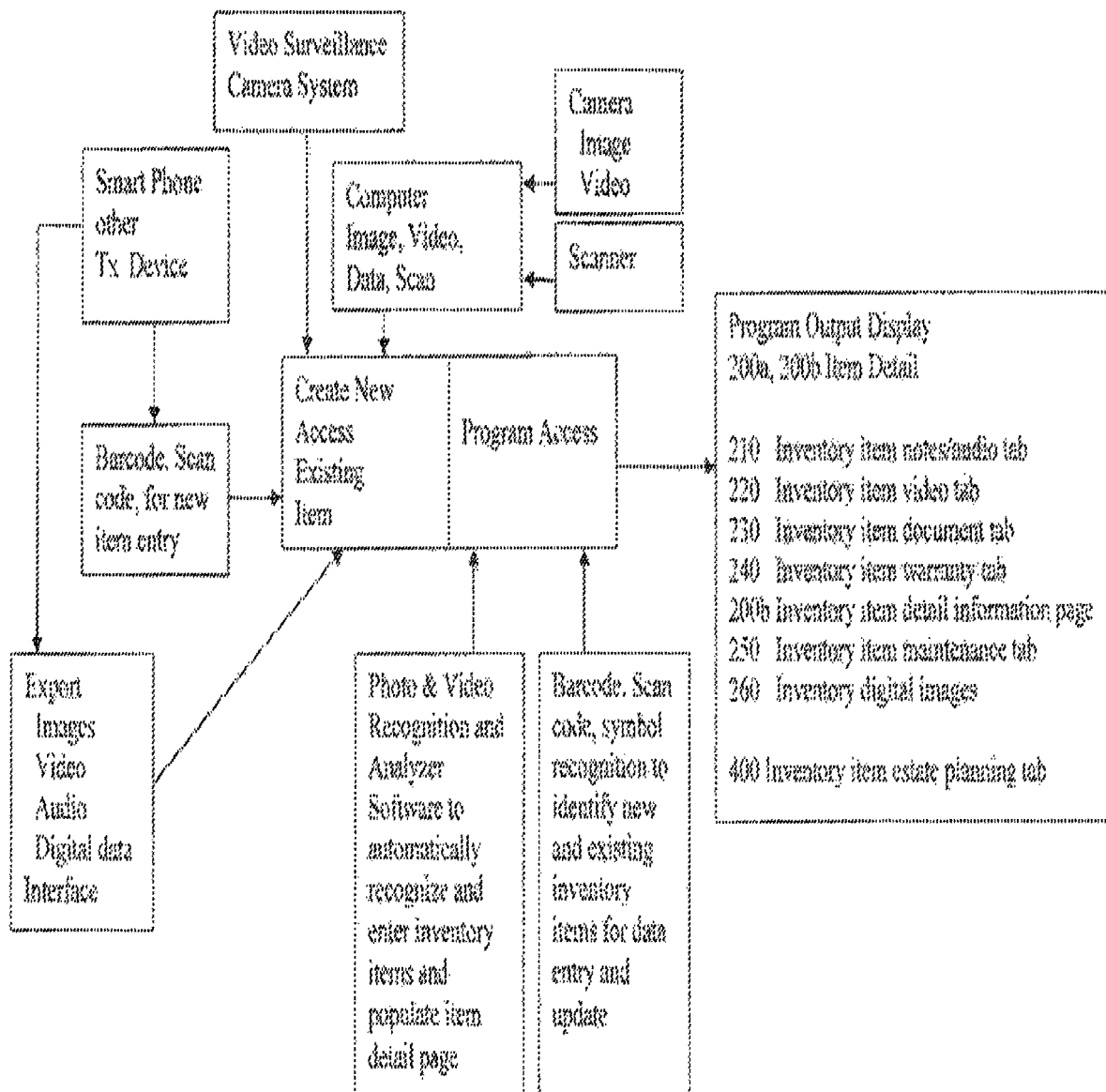
FIG. 7 is a block diagram of the inventory system according to an embodiment of the present invention showing plural interfaces between the computer systems and different peripheral devices.

Referring to FIG. 7, another feature of the methods and systems of the present invention is the capability to import and store one or more video files of various video formats in the video tab area under each "Item Details". The inventory system can support some video formats by having the video player pre-installed to automatically play as the videos accessed. These video formats therefore "stream" or load and play automatically. The videos can be of inventory items, overall rooms, documents or anything the client wants to store. Alternatively, the selected video format can play based on an installed video player on the user's specific computer. In this example, the stored inventory video file needs to be downloaded to be played on the user's computer with the appropriated "video player" already installed on the computer. An embodiment provides the ability to complete an inventory by using a cell phone using a custom "application" that allows any or all pictures, video, and data to be uploaded directly from the phone into the program.

Documents entered for one or more inventory items can be encrypted and inventory items can be disassociated from the property address and can be encrypted. For additional security, the inventory list and associated data, audio and video is stored in a secure website on the Internet. Documents can be stored on the respective "Document" tab 123 for each item, and a "receipt" or "appraisal" that is stored on this tab 123 can be linked directly to the "Item Detail" page for the "Purchase Price" and "Replacement Cost". Documents can also be store as an independent "Item" and stored in the category called "File Cabinet", or anywhere the user selects.

Inventory items can have a"beneficiary" specified for estate planning, as well as an Estate Planning tab 400, for more detailed descriptions of the estate, property, and the owners wishes and intentions. FIG. 1*f* shows an example of a screen shot for an estate planning tab 400 that allows the user to enter estate planning information such as insurance policy information, estate planning attorney information, a will, safe deposit box and funeral/burial information or any other information. An unlimited number of beneficiaries can be entered by the user under the estate planning tab 170 in order to link each respective "Item Detail" page to the intended beneficiary. Every inventory item has the capability for a beneficiary to be named for it using the item detail tab 125, and a list can be sorted to list every item designated for each beneficiary, including the sum of the values of all the items. This list could be taken to an attorney and attached to a will.

Figure 6:
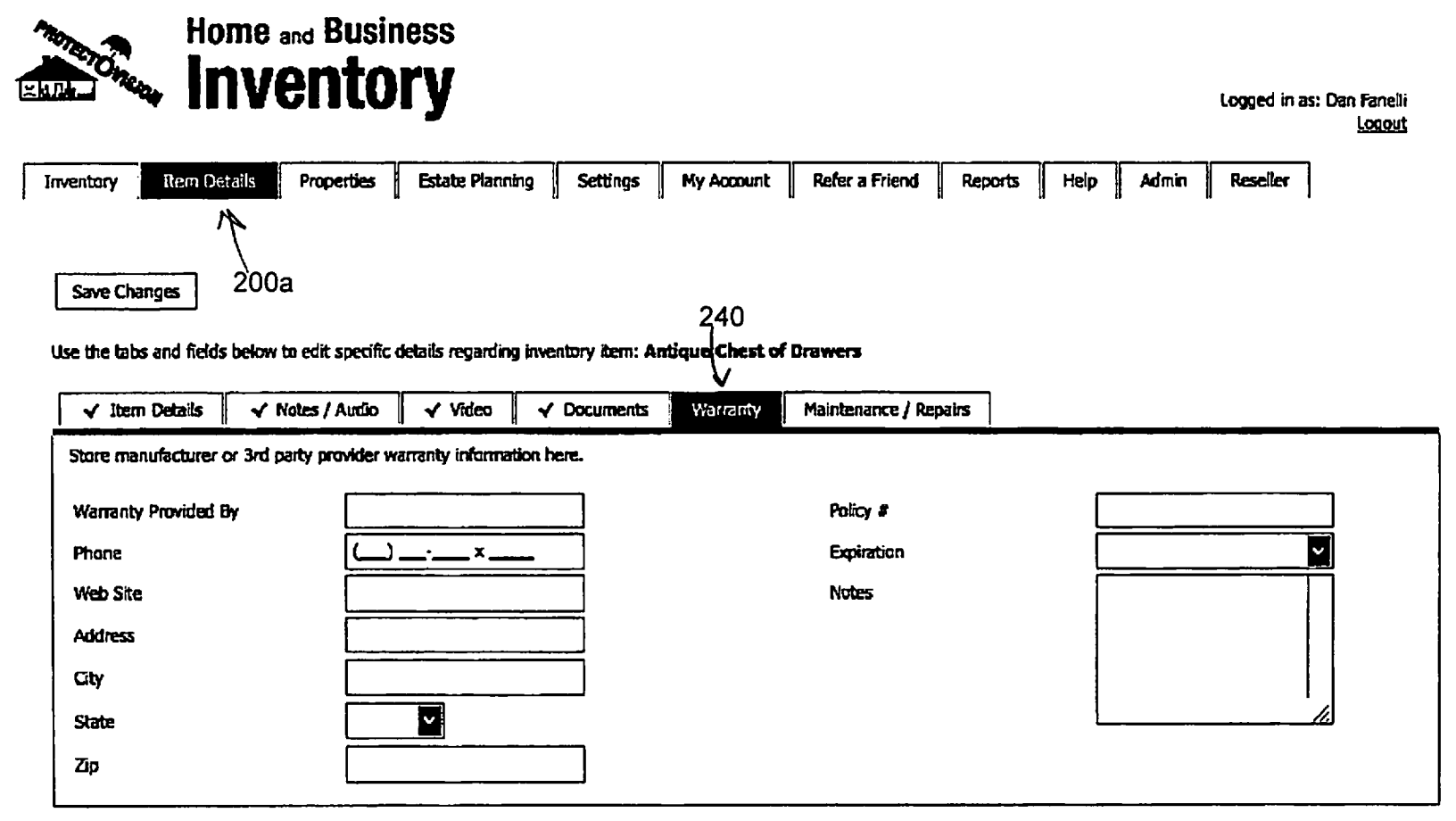

Another tab under item details is the warranty tab shown in FIG. 6 that allows the user to store information relating to the warranty policy information, phone numbers, addresses and an expiration date of the warranty. As shown in FIG. 7, a preferred embodiment provides a numeric system to identify customized inventory types for different professions or businesses with appropriate locations and categories such as doctor or dentist office, business office, manufacturing facility, auto repair shop, athletic fitness training facility, farming and agricultural equipment and inventory, government, military and the like.

The system allows the user to sort the inventory item list based on property, location, category, date range, beneficiary, value price, and the like. The system also provides a tab for creating various prepackaged or customized user developed reports under the Reports tab 800. Once the user has created a report, the report can be stored for use in the future by the same user that created the customized report. Using the customized reports and customized sorting, the inventory software of the present invention is many programs combined into one. The software can be used for individual, family, business, or government entity inventory, warranty and maintenance records, photo, video and audio storage, document record storage, estate planning, as well as video surveillance monitoring of home or business (being able to view and store this information also provides evidence that the inventory item existed at the property at the time of the loss.

Referring back to FIG. 2, the inventory tab displays a list of the items in the inventory with several different columns such as item name, physical location, location within the physical location, category, etc. The inventory system allows the user to search for inventory items using the search box within the inventory list to search for inventory items by name, category, location, etc. . . . the user can optionally apply multiple search criteria/filters at once and can sort in ascending and descending order.

Inventory items in each column can be searched independently, or in combination. For example, the user can search the item name list for a particular item. When there is more than one physical location for the inventory item, the user can search using the item name in combination with the physical location column to add a second level filter to the search. The search can be general, or can be more detailed by adding additional filters. The inventory screen also allows the user to create a "filter" for future use. Then when the user logs in and selects the inventory tab, the user can use the saved filter to initiate a search.

The user's account information is located under the My Account tab 600 includes contact information, turn on/off the 'auto renew' feature, change your password, view your billing history, print a receipt can be viewed and edited. After logging into the user account, the user selects the My Account tab 600 and the system displays tabs related to the users contact information, credit card, subscription, file storage, change password and billing history. The contact tab includes name, phone, email address and street address. The subscription detail includes account number, billing period and the next renew date and allows the user to select or deselect auto renewal of the subscription. The file storage tab allows the user to view the file storage usage and purchase additional storage area. Once all of the changes have been made, the user simply clicks the save changes icon to document and save the changes.

The software settings can be adjusted by the user which allows the user to change the color scheme used by the software, to turn on/off grid view paging and set the number of records displayed at a time when paging is turned on. Once the software changes have been adjusted, the user clicks on the save changes icon. Inventory items can be moved to the "Donate Room" location for those items donated during the year for Income Tax purposes. Since there is a record of the value, at the end of the fiscal year, the total charitable contribution is recorded.

In a preferred embodiment, the user can give "read only" access to their entire account or only selected portions of their account by assigning a specific name and password to different people or businesses. This "read only" access could be given to their attorney, financial planner, accountant/tax preparer, children, or anyone they choose. Instructions can be included on the Estate Planning tab, as well as provide access to important information like a "Last Will and Testament" and other information that may be needed that is accessible on the internet, instead of traveling to their home or business. The user can be provided with an email message whenever a third party access the account with this privilege. A history of all access by these individuals is also stored on the account for the client's review.

FIG. 7 is a schematic block diagram showing wired and wireless interconnections between a variety of peripherals and the inventory software according to the present invention. As shown, the inventory system includes an access port for users, resellers and authorized inventory professionals to access the inventory software to access existing inventory database and create a new inventory database. The inventory system also includes interfaces for downloading digital data for creating an inventory list and making changes to an existing inventory list. The peripheral devices include a scanner 300, camera 400 downloading video images, and barcode scanner 600 to download digital data corresponding to barcodes associated with items being inventoried. A video surveillance system 500 can be used for downloading surveillance video that is automatically processed by the inventory system to identify inventory items shown in the surveillance videos. Cellular telephones and other handheld wireless devices 700 can also be used to input data, images, video and audio to the inventory system.

The interface algorithms coupled with the inventory system include one or more of photo & video recognition software to automatically recognize and enter inventory items and populate item details, barcode, scan code, symbol recognition software to identify new and existing inventory items for subsequent entry into the inventory item detail information page 110 including the inventory item audio tab 121, inventory item video tab 122, inventory item document tab 123, inventory item warranty tab 124, inventory item maintenance tab 126 within the inventory item detail page. Data can also be downloaded to the inventory item estate planning tab 170 for recording a will or trust documents.

Figure 9:
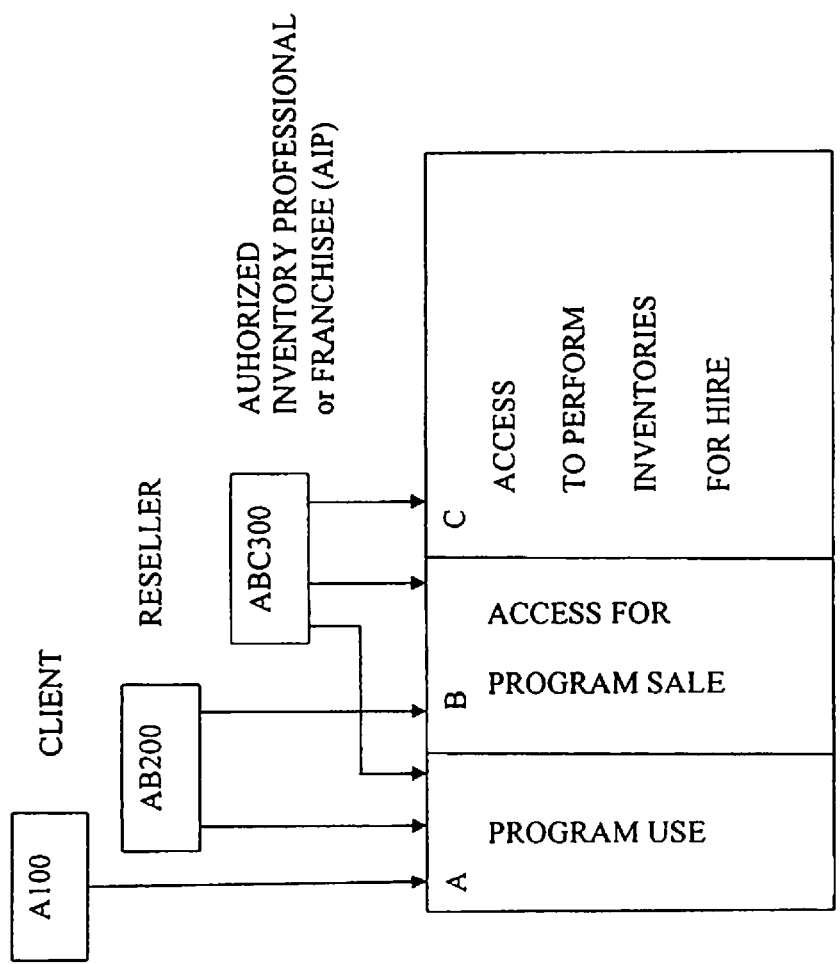
FIG. 9 is a block diagram showing different levels of access to proprietary inventory software by the different types of users.

FIG. 9 is a block diagram showing different levels of access to proprietary inventory software by three different types of users. The program incorporates the ability for independent contractors or franchisees called "Resellers" (AB200) or "Authorized Inventory Professional" (ABC300) to perform work for clients, and earn a specified dollar amount per program sale and per inventory completed, built right into the inventory software. The revenue they earn can be a specific or variable percentage of the revenue that they generate. The percentage split that they earn can be adjusted by the Administrator based on achieving volume sales targets or as agreed to in advance.

For example, the Reseller AB200 has access for program sales and when sales are completed, can receive compensation according to (Program Sale)×(% per sale)=$P$(Paid to the Reseller)

A program sale is the sale of access to the inventory software to allow the client to complete a self inventory for the home, family or business. Payments can be automatically direct deposited into the Reseller's bank account by the program, or other payments options can be negotiated.

The Authorized Inventory Professional (ABC300) receives payment for program sales and for client inventory completion. The program sale compensation is a percentage of the sale which is calculated according to the same formula as the Reseller compensation, however, the percentage commission per sale can vary. For example, the commission percentage can vary based on volume of sales, in which case the payment is calculated according to (Program Sale)×(% per sale)=$P$(paid to the AIP)

(Inventory Completion Hrs)×(Hourly rate)×(% volume sales)=$I$

Compensation to AIP=$P+I$

Similarly to payment to the Reseller, Payments can be automatically direct deposited into the Reseller's bank account by the program, or other payments options can be arranged.

The inventory system has 3 levels of access. As shown in FIG. 9, level one (A100) is "Client" only has access to the inventory program in block A for inventory needs. Level two (AB200) is the "Reseller". The reseller is provided with access to the inventory program in block A and the "back-end" of the program shown as block B, in order to be able to sell the program and be paid a percentage or flat fee for program sales. The "Reseller" has access to see which client program sales went through, and to see which sales have been paid, or remain yet to be paid. Payments for sales are a percentage of the sales and are electronically deposited to the "Reseller's" personal and private account.

Level three (ABC300) access is for the "Authorized Inventory Professional" (AIP) or Franchisee, who has access to the inventory program, can resell the program, and can perform inventories for clients. The authorized inventory professional has access to see which client program sales went through, and to see which sales have been paid, or remain yet to be paid. The authorized inventory professional also has the ability to select an agreed upon hourly rate from a range in the program for each inventory job, access to see each client's job, the hourly rate, the hours worked, the percentage earned based on volume of sales, the amount earned, and if payment for this work has been paid or is waiting to be paid. Payments for inventory sales are a percentage of the total dollar amount for performing the inventory and are electronically deposited to the "Reseller's" personal and private account. The system also provides the ability to be able to split commissions between two or more independent contractors.

When client inventory is conducted by an authorized inventory professional, the program has the capability for authorized inventory professional's to check the Certified box, showing that the specified item has been observed to exist at the respective location as entered for verification purposes. This is particularly useful for business inventory, for designating a beneficiary for specific inventory items such as antiques and artwork.

FIG. 9 is a block diagram showing the multiple levels of control for the administrator to oversee and control a back-end business development system for multiple subgroups to utilize the program and business method for sale, distribution and inventory completion and inventory data storage.

Figure 10:
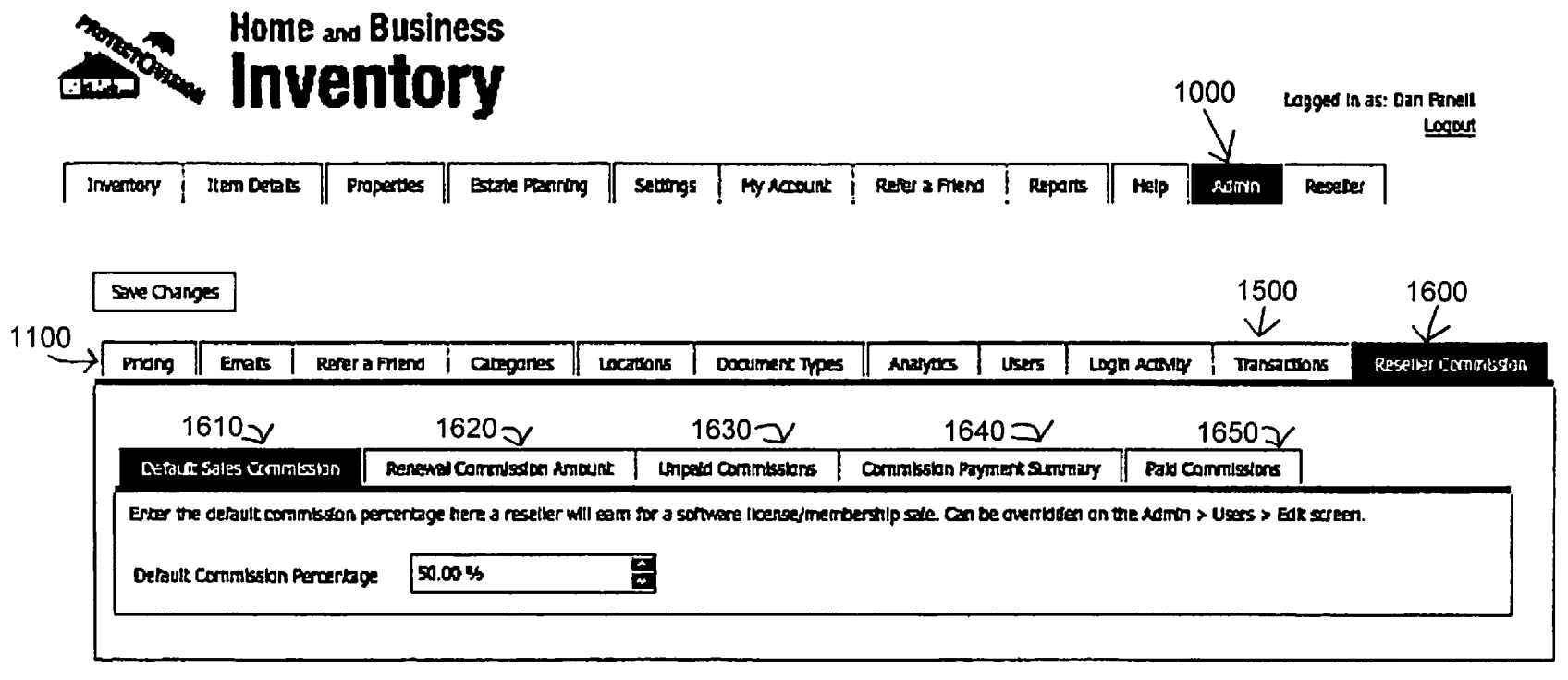
Figure 11:
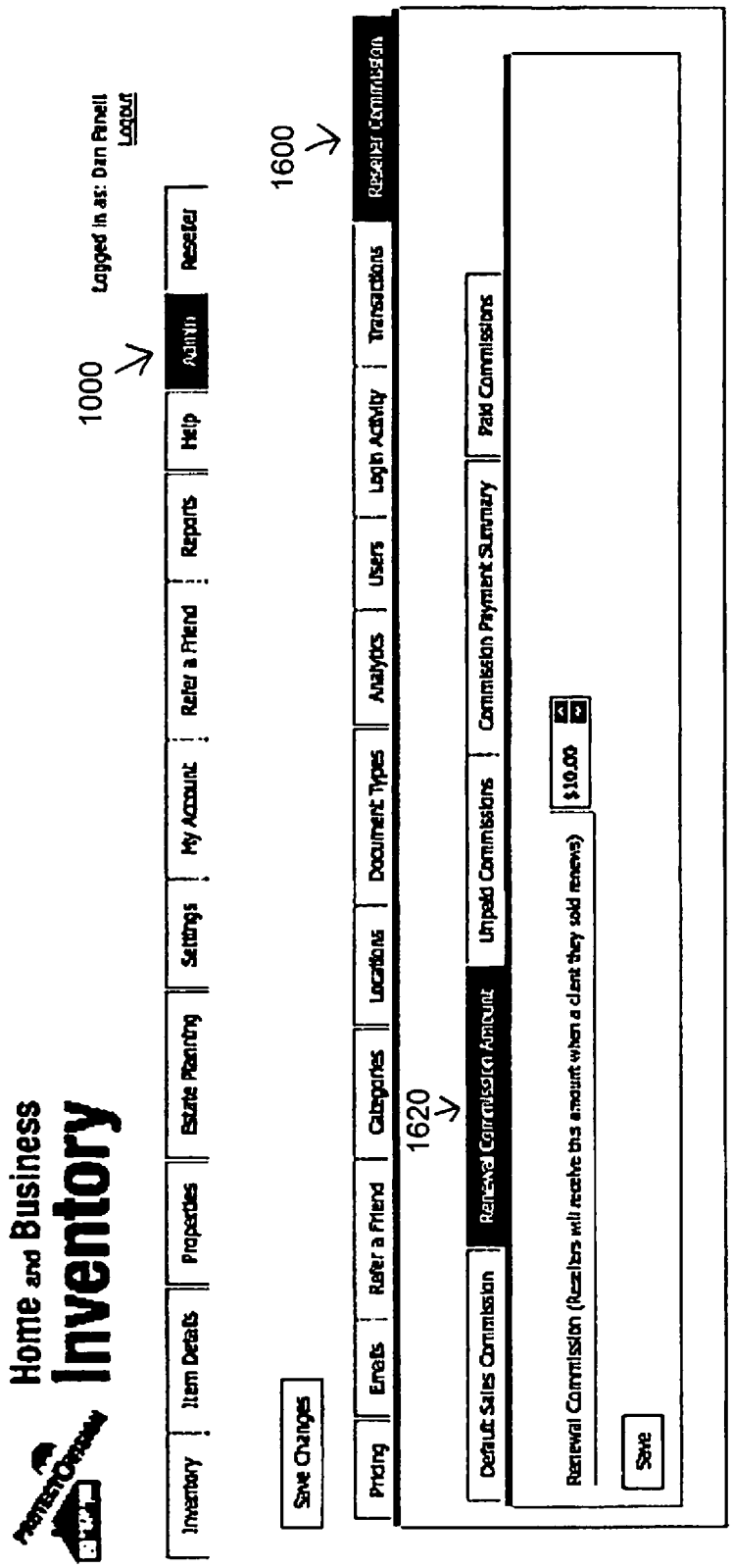
FIG. 11 shows an example of an administration screen for reseller renewal commission.

The methods and systems of the present invention provide screens for administration that is accessible by resellers and authorized inventory professionals. The administration tab 1000 opens a screen where the reseller or authorized inventory professionals have access for product pricing 1100, transactions 1500, commissions 1600 and the like. As shown, options under the reseller commissions tab 1600 can include default commission 1610 renewal commission 1620, unpaid commission 1630, commission payment summary 1640 and paid commission 1650. FIG. 10 shows an example of an administration screen for default sales commission 1630. In the example shown the commission is 50%, however the commission can be adjusted up or down. Resellers and authorized inventory professions can also be paid a commission for renewals. FIG. 11 shows an example of an administration screen for renewal commission 1640 that is adjustable up or down.

Figure 12:
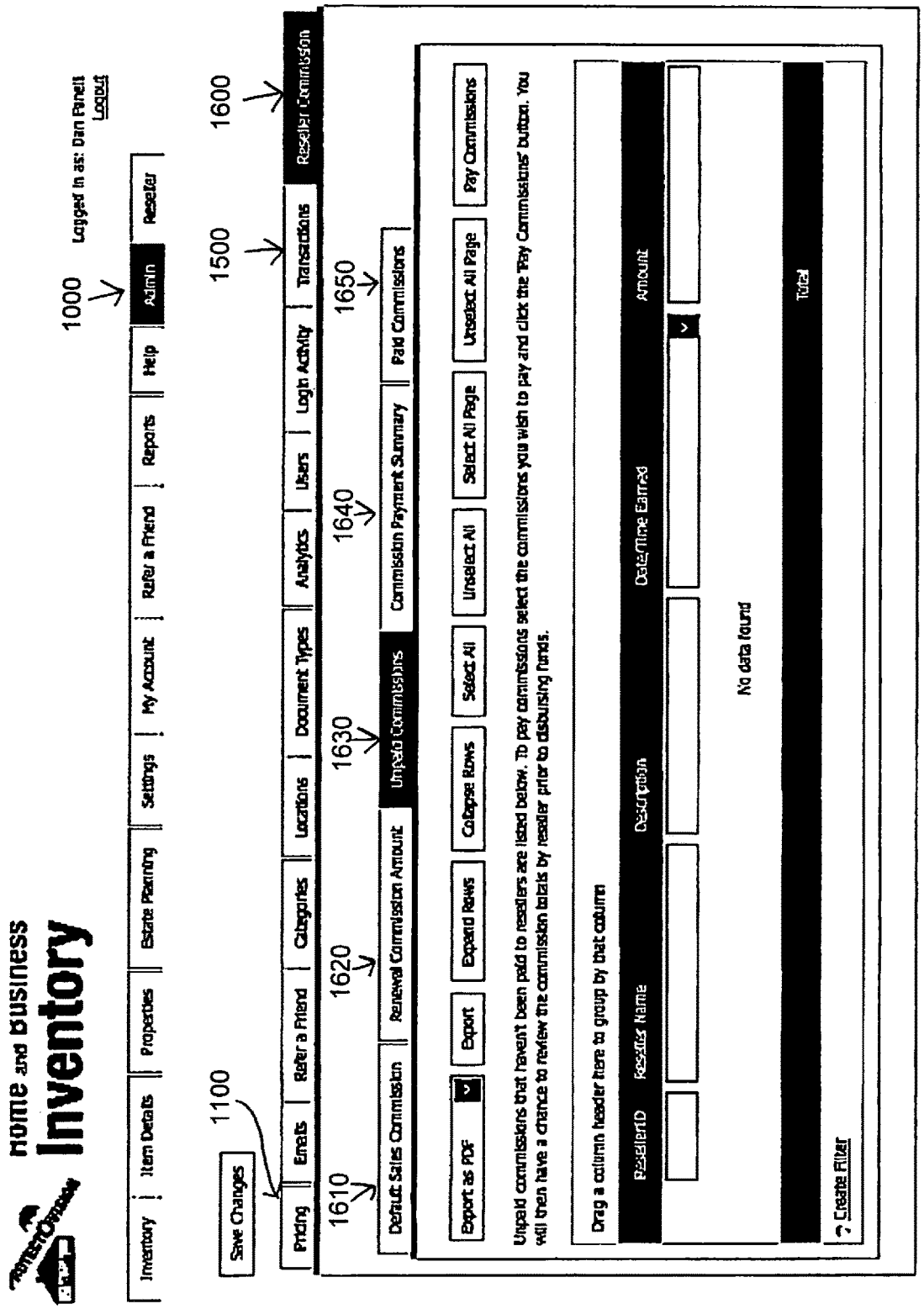
FIG. 12 shows an example of an administration screen for reseller commission, more specifically a unpaid commission.
Figure 13:
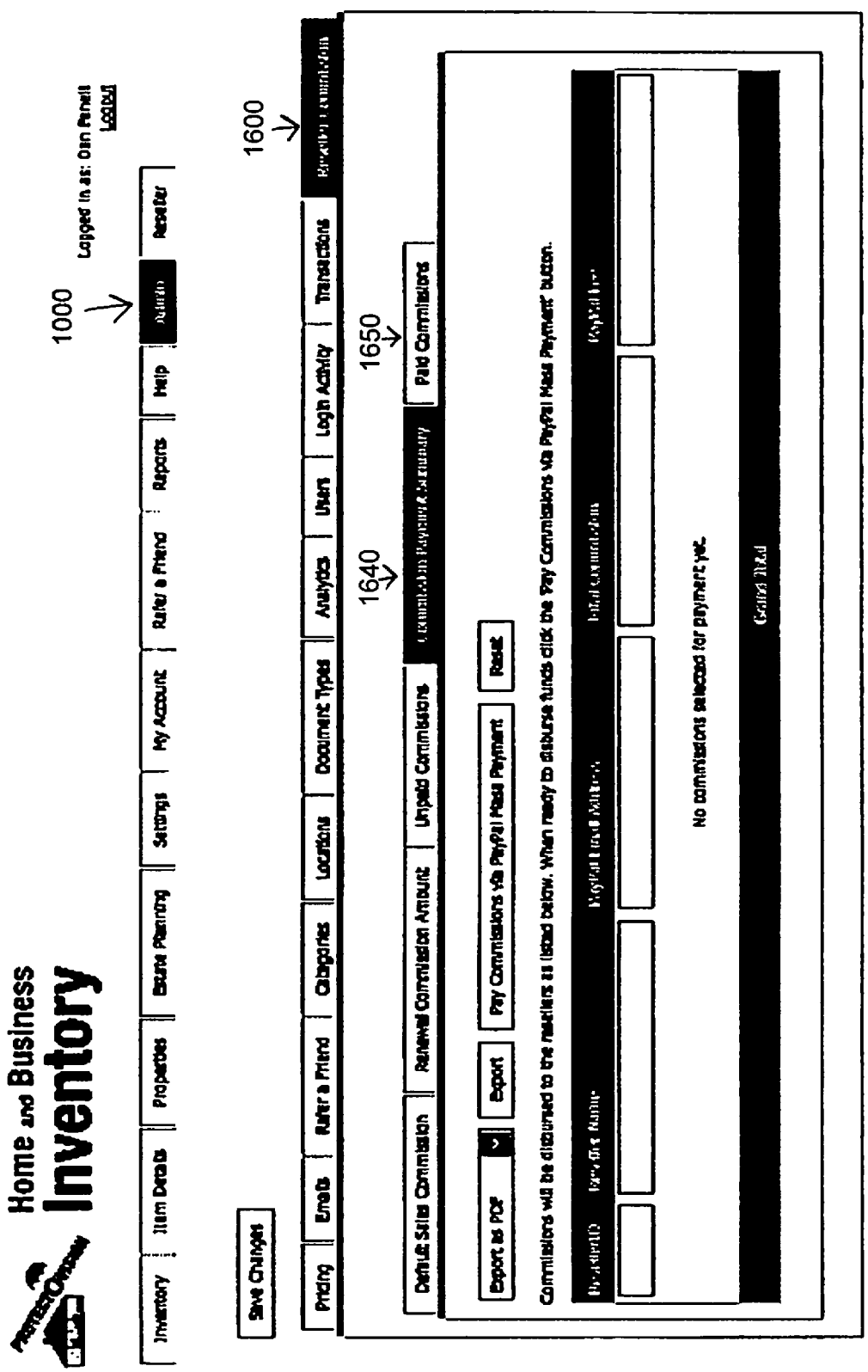
FIG. 13 shows an example of an administration screen for reseller commission, more specifically a commission payment summary screen.
Figure 14:
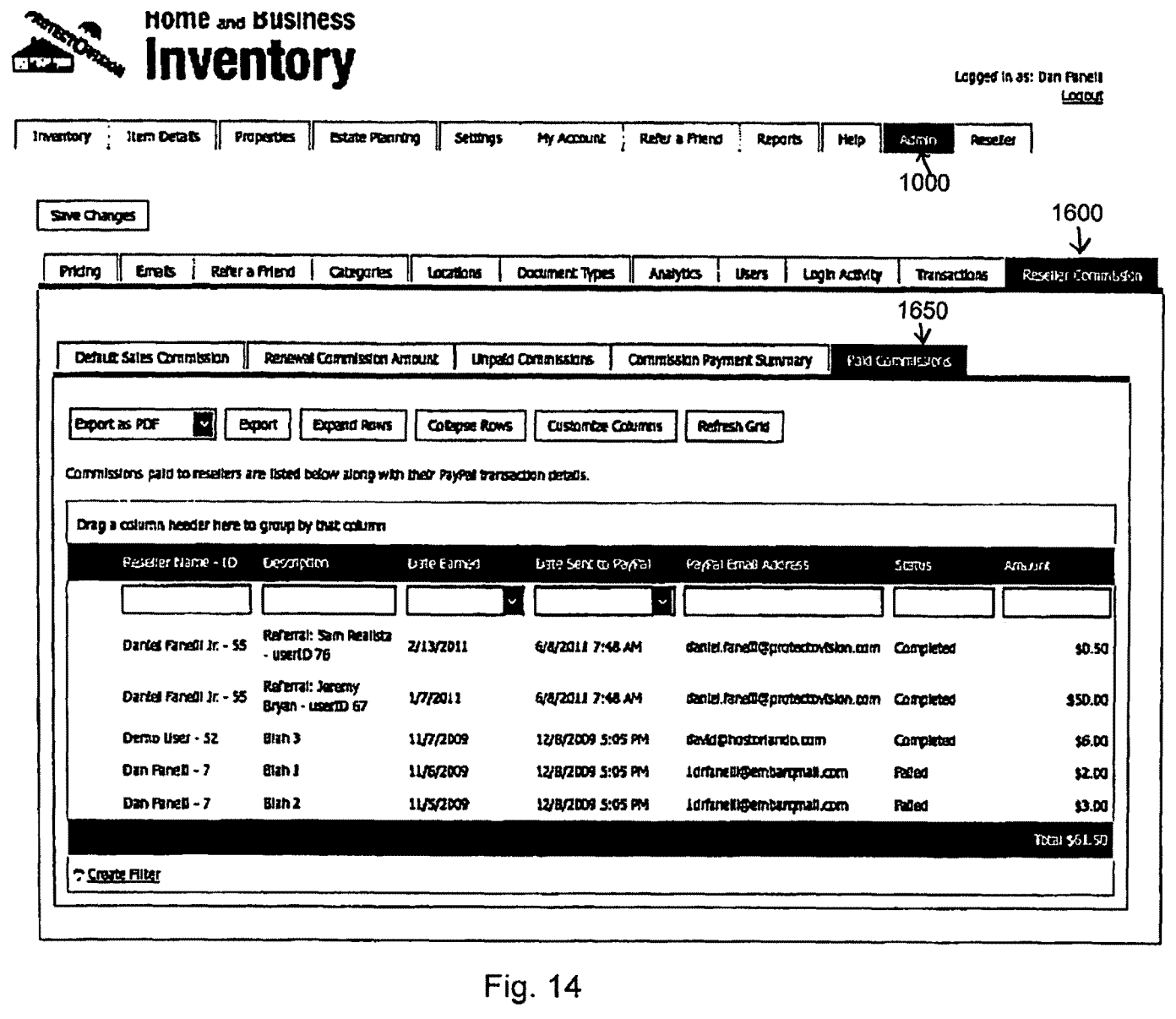

The methods and systems of the present invention tracks sales and renewals. FIG. 12 shows an example of an administration screen for reseller unpaid commission 1630 showing a list of earned commissions that have not been paid to the reseller or authorized inventory professional. As shown, the screen includes the reseller ID, reseller name, date the commission is earned and the amount of commission earned. FIG. 13 shows an example of an administration screen for commission payment summary to show which commissions have been paid. The screen includes the reseller ID, reseller name, date the commission is earned, total commission earned and a fee for payment via PayPal. FIG. 14 shows an example of an administration screen for reseller commission, more specifically, paid commissions. As shown, the paid commissions screen displays commissions paid to the reseller by reseller name and includes a description, the date the commission was earned, the date paid and the status of each of the commissions.

Figure 15:
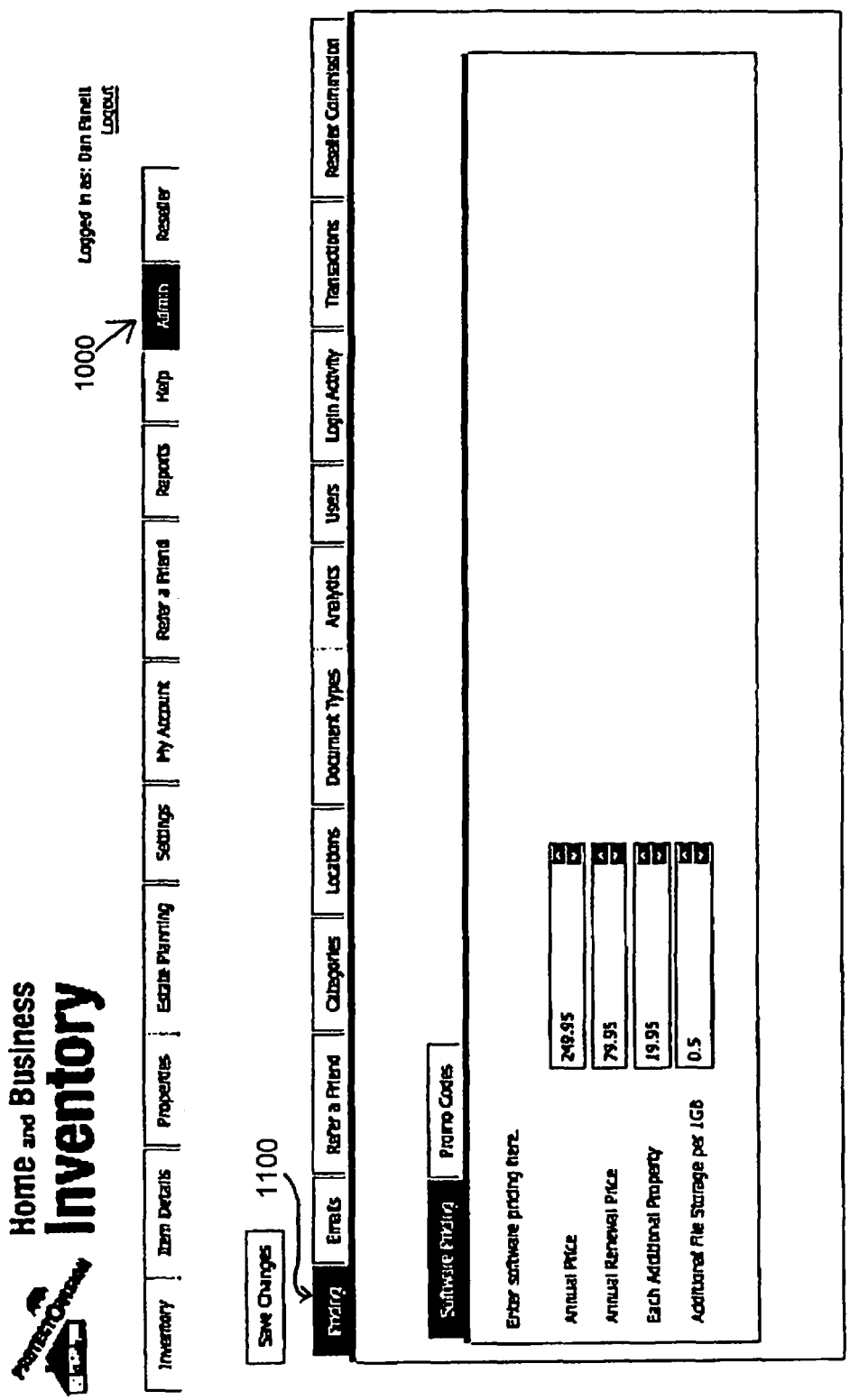
FIG. 15 shows an example of an administration screen for product pricing, and more specifically, software product pricing.
Figure 16:
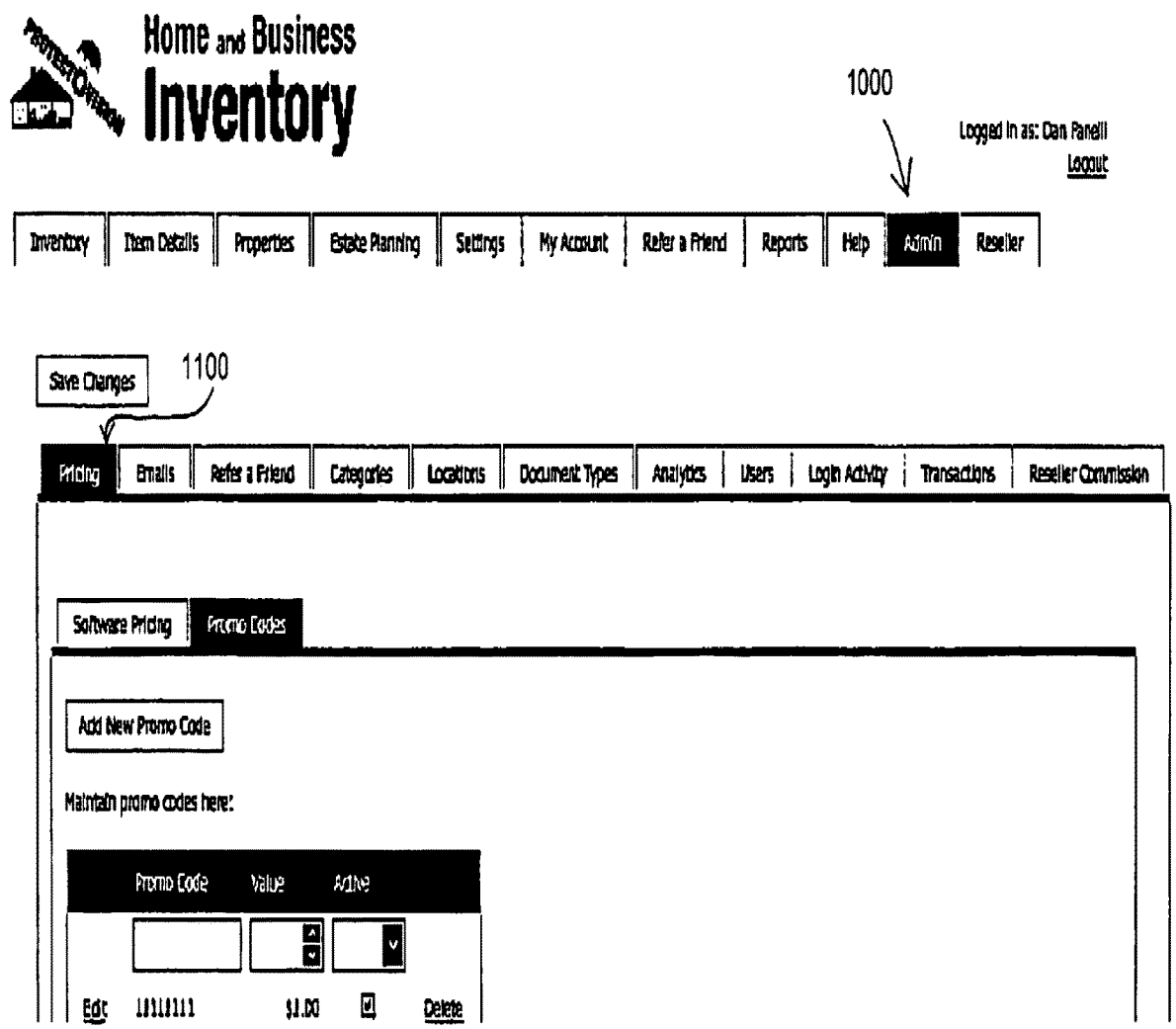
FIG. 16 shows an example of an administration screen for product pricing, and more specifically, promo codes.
Figure 17:
FIG. 17 shows an example of an administration screen for email correspondence with the reseller.
Figure 18:
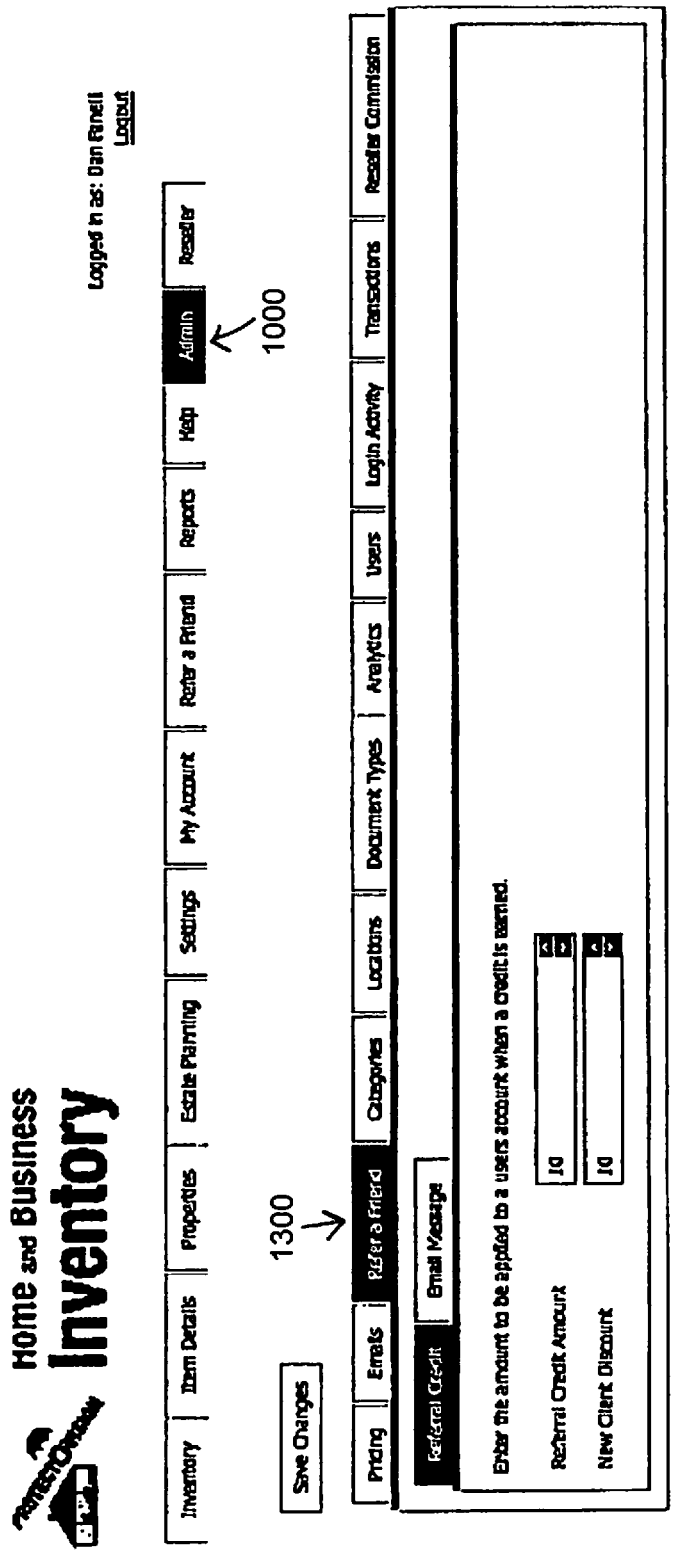
FIG. 18 shows an example of an administration screen for referring a friend and the reseller receiving credit for the referral.
Figure 19:
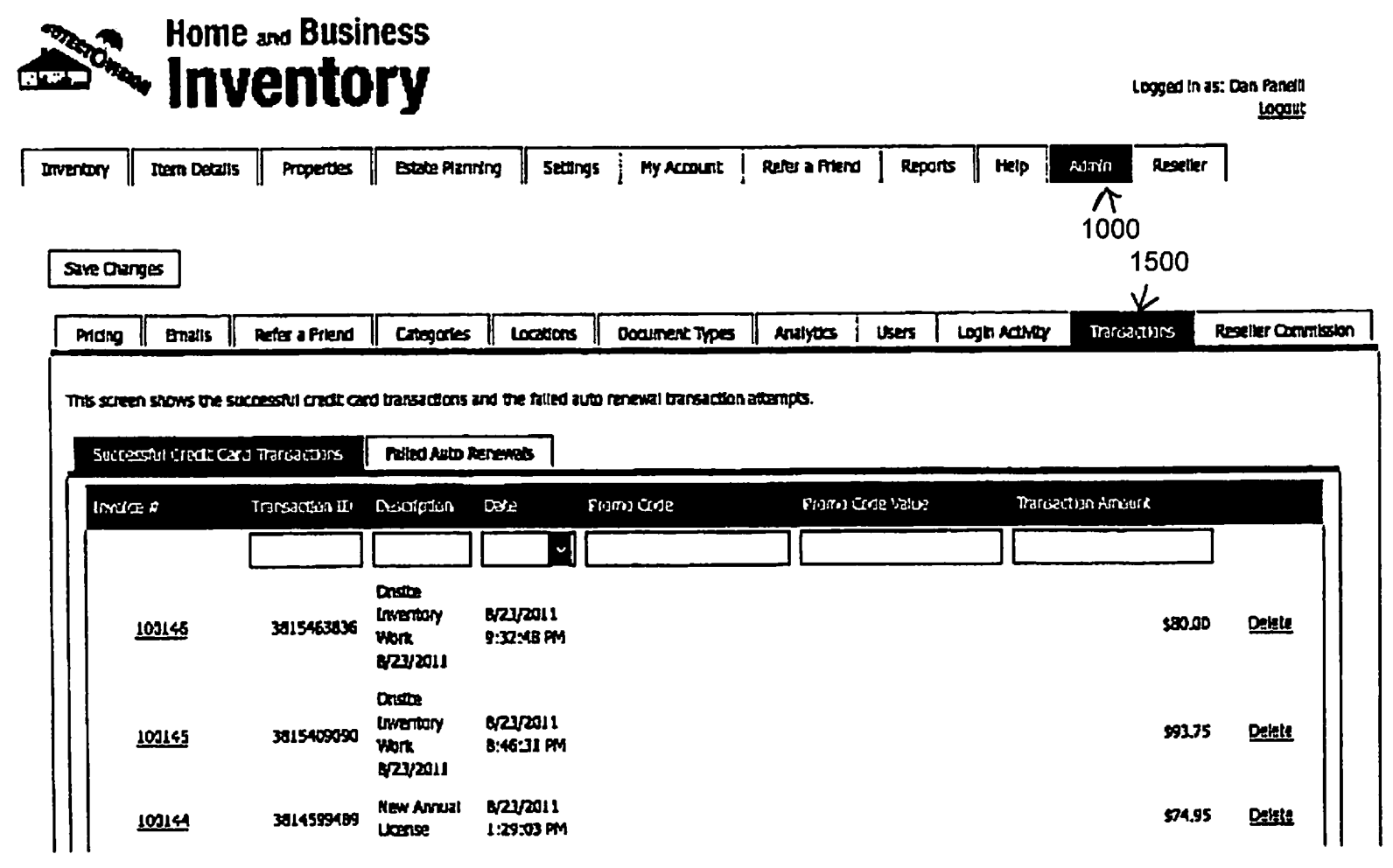

Other administration screens include software pricing and promotions. FIGS. 15 and 15 show examples of administration screens for product pricing, and for promo codes, respectively. As shown in FIG. 15, pricing includes the initial cost of the inventory software, the annual renewal price and the cost for additional file storage space. Each of the different prices can be increased or decreased. The reseller can also use promo codes to discount the prices and add new promo codes for new promotions. Email messages can be sent to the reseller covering subjects such as account details, automatic renewals, 30 day reminder for renewals and non-renewals, third party logins and login notifications as well as receipts as shown in FIG. 17. The administration screens can also include a tabs for referring a friend and transactions. The referring a friend tab displays referral credits for each referral as shown in FIG. 18. FIG. 19 shows an example of the transaction tab that includes sub tabs for successful credit card transactions and failed automatic renewals listed by invoice number and including the transaction identification number, description and date to name a few.

Figure 20A:
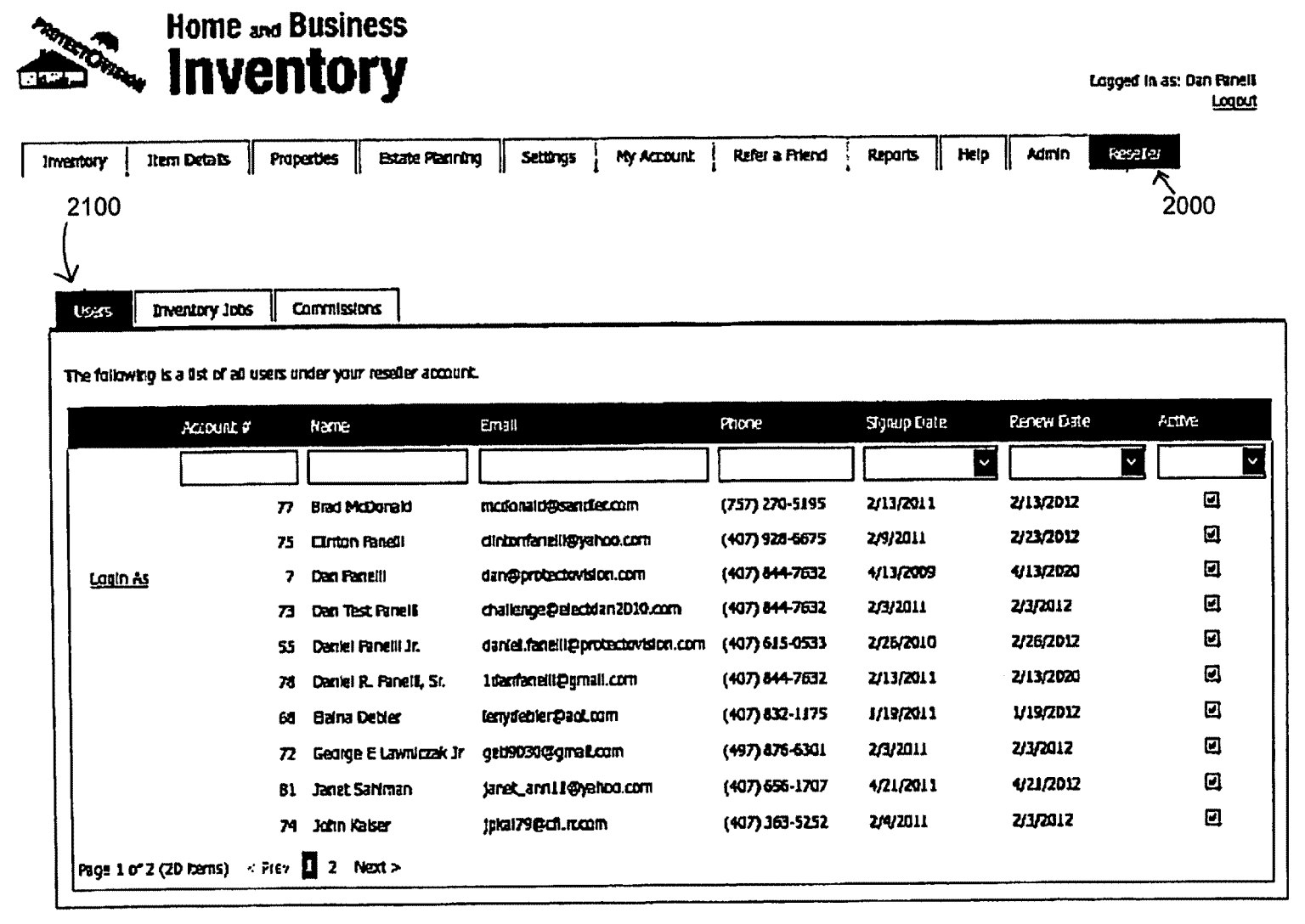
Figure 20B:
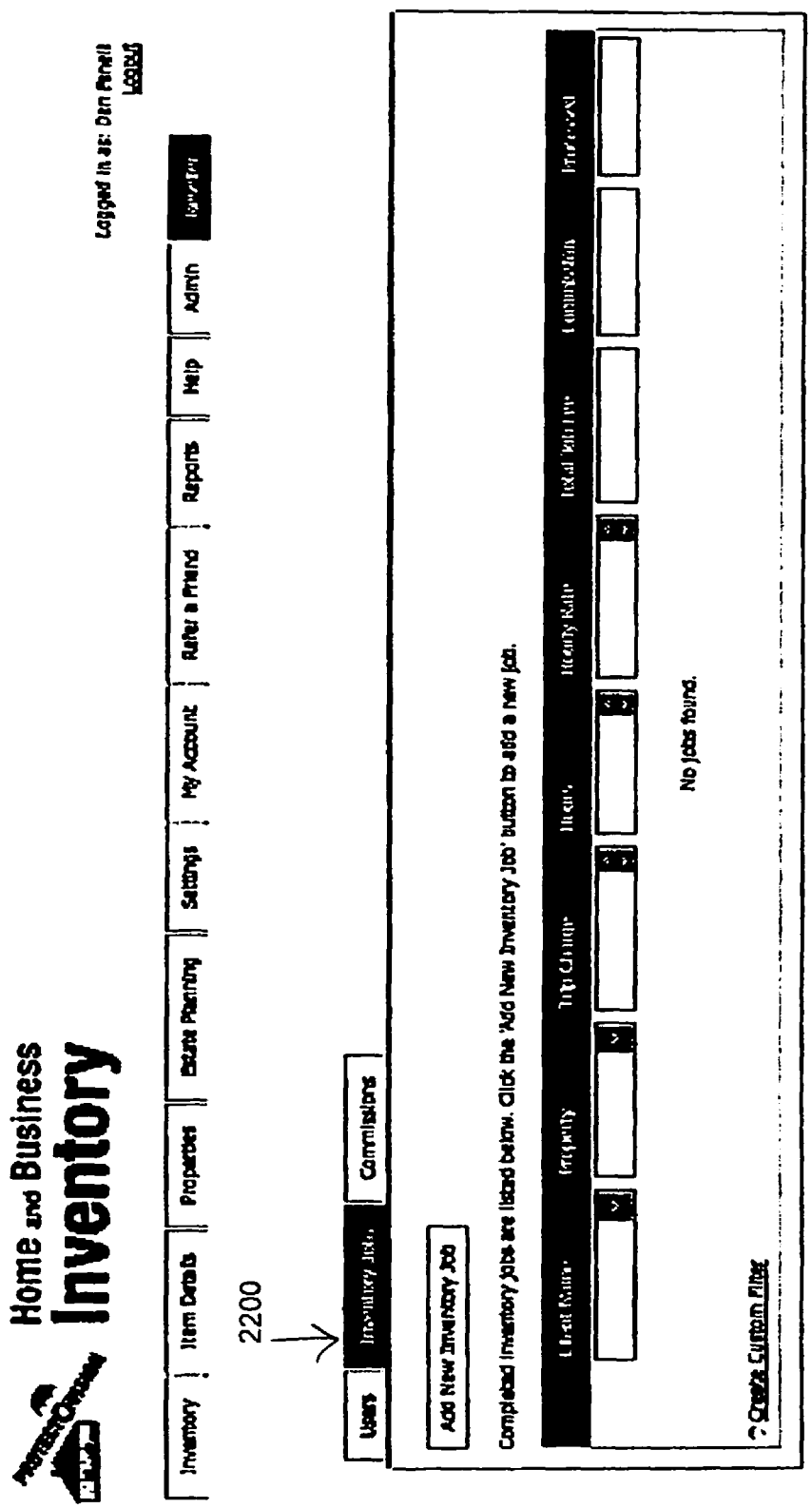
FIG. 20b shows an example of a screen shot of the reseller tab, more specifically, inventory jobs.
Figure 20C:
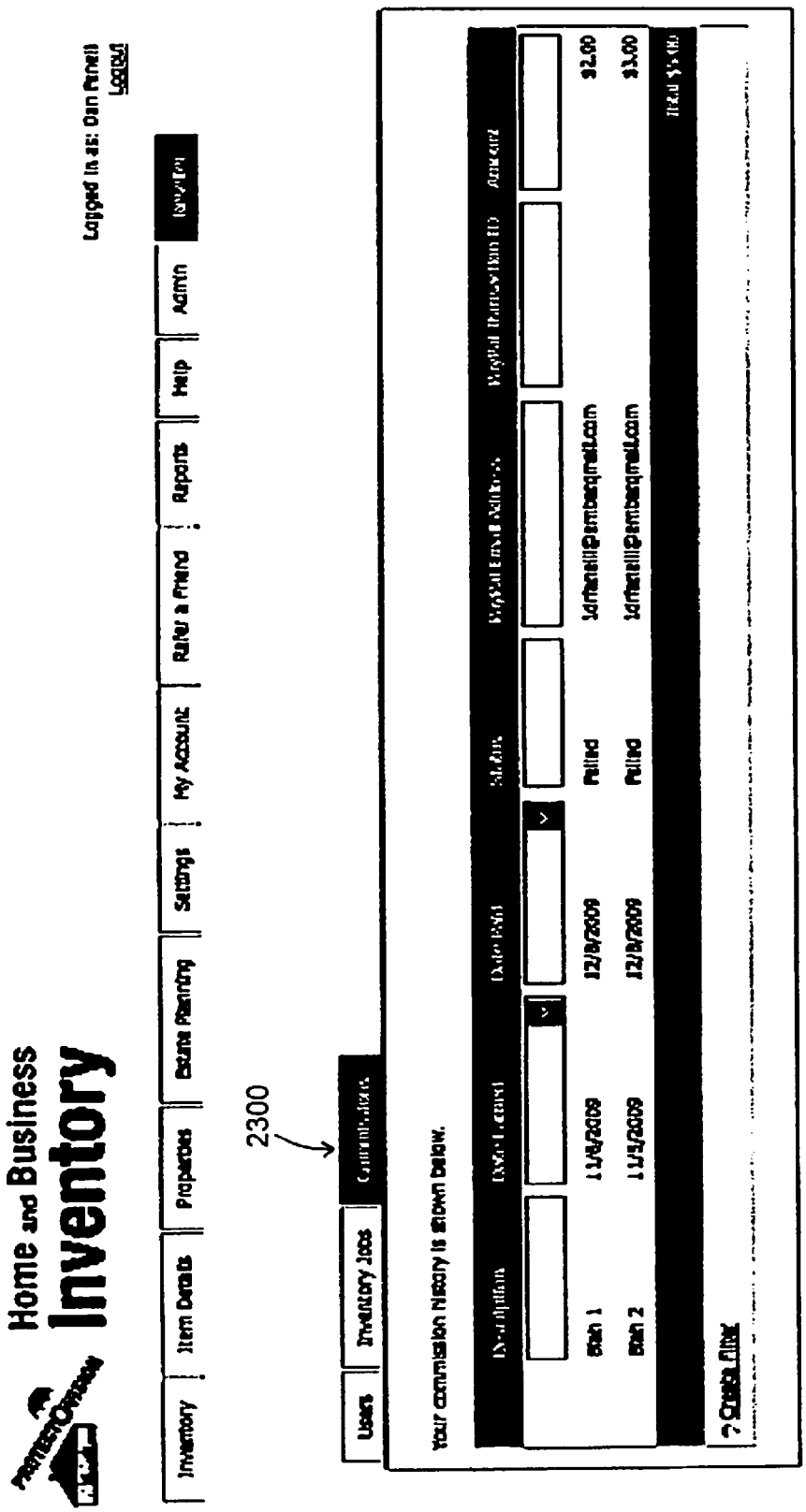
FIG. 20c shows an example of a screen shot of the reseller tab, more specifically, commissions.

The methods and systems of the present invention include a reseller tab 2000 that includes sub tabs for users, inventory jobs and commissions. FIG. 20a shows an example of a screen shot of the reseller tab, more specifically, users listed as resellers including an account number, name, email address, phone number, the date the user signed up and the renewal date. FIG. 20b shows an example of a screen shot of the reseller tab, more specifically, inventory jobs tab for 2200 that shows a list of the completed inventory jobs and allows the user to add new inventory jobs. The reseller tab also includes a sub tab for commissions 2300 as shown in FIG. 20c. The commission tab 2300 displays a commission history for a particular reseller.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An inventory documenting and recognition system for items comprising:
    a computer processor;
    an inventory software program stored in a memory connected to the computer processor, the inventory software program including instructions executable by the computer processor;
    an access port configured to:
        allow a user to access the inventory software program and generate a user inventory list storable in a user database; and
        allow a software reseller to access the inventory software program and sell access to the inventory software program for generating the user inventory list and storing the user inventory list;
    one or more input devices for inputting data, images, documents and video corresponding to one or more of a plurality of items in a room, the one or more input devices comprising:
        a scanner for scanning at least one of a bar code or a scan code on the one or more of the plurality of items in the room, and
        a portable camera for providing digital pictures and videos of the one or more of the plurality of items in the room, and surveillance video;
    the inventory software program comprising:
        a stored recognition database;
        computer vision technology configured to automatically recognize inventory items visually found in the digital pictures and videos, using the stored recognition database;
            the computer vision technology configured to automatically recognize inventory items found in the surveillance video, using the stored recognition database;

the computer vision technology further configured to automatically generate an itemized inventory list that lists the inventory items automatically recognized by the computer vision technology;

instructions to automatically populate an item name corresponding to a recognized barcode or a recognized scan code using the stored recognition database, and add the item name to the user inventory list; and instructions to identify new and existing inventory items for subsequent entry into an inventory item detail information page.

2. The system of claim 1, wherein the inventory item detail information page comprises:

one or more of a date, a beneficiary, and a purchase price.

3. The system of claim 1 wherein the inventory item detail information page comprises a property field that allows the user to identify plural properties each separately identifiable by a different postal address corresponding to one of a residential property postal address and a business property postal address.

4. The system of claim 1, further comprising:

wherein the inventory item detail information page comprises:

one or more remember fields corresponding to each of a property field, a location field, and a category field, wherein the one more remember fields are configured to automatically pre-populate details corresponding to each of the property field, location field, and category field; and a save and add new item field to save an entered item and add a next new item to the user inventory list with an item name field cleared and the one or more remember fields pre-populated.

5. The inventory system of claim 1 wherein the access port is further configured to provide the software reseller:

access to client account information including account number, name, email address, phone number, start up and renewal date and transactional information including commissions generated from inventory software sales.

6. The system of claim 1, further comprising:

an input port configured to upload information corresponding to scanning one or more of an identifiable bar code, identifiable scan code, or a QR code placed on an item.

7. The system of claim 1, further comprising:

a graphical user interface comprising a search field and a filter field to allow the user to sort the user inventory item list based on item name, property, location, category, date, date range, beneficiary, purchase price, and replacement cost.

8. An inventory documenting and recognition system for items comprising:

a computer processor;

an inventory software program stored in a memory connected to the computer processor, the inventory software program including instructions executable by the computer processor;

an access port configured to:

allow a user to access the inventory software program and generate a user inventory list storable in a user database, and allow an authorized inventory professional to access the inventory software program, sell use of the inventory software program, create the user inventory list for a fee, a user interface comprising:

one or more input devices for inputting data, images, documents and video corresponding to one or more of a plurality of items in the room, the one or more input devices comprising a scanner for scanning at least one of a bar code or a scan code on the one or more of the plurality of items in the room, a portable camera for providing digital pictures and videos of the one or more of the plurality of items in the room, and surveillance video;

the inventory software program comprising:

a stored recognition database;

interfaces configured to download digital data from the one or more input devices, the digital data related to the one or more of the plurality of items in the room, the digital data comprising the bar code, a digital photograph or video, a digital document, and the surveillance video, computer vision technology configured to automatically recognize inventory items visually found in the digital photograph or video, using the stored recognition database;

the computer vision technology configured to automatically recognize inventory items found in the surveillance video, using the stored recognition database;

the computer vision technology further configured to automatically generate an itemized inventory list that lists the inventory items automatically recognized by the computer vision technology;

instructions to automatically populate an item name corresponding to a recognized barcode or scan code using the stored recognition database, and add the item name to the user inventory list;

instructions to identify new and existing inventory items for subsequent entry into an inventory item detail information page.

9. The system of claim 8, wherein the inventory item detail information page comprises:

one or more of a date, a beneficiary, and a purchase price.

10. The system of claim 8, wherein the inventory item detail information page comprises a property field that allows the user to identify plural properties each separately identifiable by a different postal address corresponding to one of a residential property postal address and a business property postal address.

11. The system of claim 8, further comprising:

wherein the inventory item detail information page comprises:

one or more remember fields corresponding to each of a property field, a location field, and a category field, the one more remember fields configured to automatically pre-populate details corresponding to each of the property field, location field, and category field; and a save and add new item field to save an entered item and add a next new item to the user inventory list with an item name field cleared and the one or more remember fields pre-populated.

12. The system of claim 8, further comprising:

an input port configured to upload information corresponding to scanning one or more of an identifiable bar code, identifiable scan code, or a QR code placed on an item.

13. The system of claim 8, further comprising:

a graphical user interface comprising a search field and filter field to allow the user to sort the user inventory item list based on item name, property, location, category, date, date range, beneficiary, purchase price, and replacement cost.

14. An inventory documenting and recognition system for items comprising:
- a computer processor;
- an inventory software program stored in a memory connected to the computer processor, the inventory program including instructions executable by the computer processor;
- an access port configured to:
  - allow a user to access the inventory software program and generate a user inventory list storable in a user database,
- one or more input devices for inputting data, images, documents and video corresponding to one or more of a plurality of items in the room, the one or more input devices comprising:
  - a scanner for scanning at least one of a bar code or a scan code on the one or more of the plurality of items in the room, and
  - a portable camera for providing digital pictures and videos of the one or more of the plurality of items in the room, and surveillance video;
- the inventory software program comprising:
  - a stored recognition database;
  - interfaces configured to download digital data from the one or more input devices, the digital data related to the one or more of the plurality of items in the room, the digital data comprising the bar code, the scan code, the digital pictures and videos, a digital document, and the surveillance video,
  - computer vision technology configured to automatically recognize inventory items visually found in the digital pictures and videos, using the stored recognition database;
  - the computer vision technology configured to automatically recognize inventory items found in the surveillance video, using the stored recognition database;
  - the computer vision technology further configured to automatically generate an itemized inventory list that lists the inventory items automatically recognized by the computer vision technology;
  - instructions to automatically populate an item name corresponding to a recognized barcode or scan code using the stored recognition database, and add the item name to the user inventory list;
  - instructions to identify new and existing inventory items for subsequent entry into an inventory item detail information page.

15. The system of claim 14, further comprising:
wherein the inventory item detail information page comprises:
one or more remember fields corresponding to each of a property field, a location field, and a category field, the one or more remembers fields configured to automatically pre-populate details corresponding to each of the property field, location field, and category field; and
a save and add new item field to save an entered item and add a next new item to the user inventory list with an item name field cleared and the one or more remember fields pre-populated.

16. The system of claim 14, further comprising:
an input port configured to upload information corresponding to scanning one or more of an identifiable bar code, identifiable scan code, or a QR code placed on an item.

* * * * *